United States Patent [19]
Takegahara et al.

[11] Patent Number: 5,970,046
[45] Date of Patent: Oct. 19, 1999

[54] APPARATUS FOR DEMODULATING AM DATA MULTIPLEXED MODULATED WAVE SIGNAL

[75] Inventors: Toshiyuki Takegahara, Tokyo; Shoichi Suzuki, Yokohama; Kenichi Shiraishi, Yokohama; Hiroyuki Nagasaka, Yokohama; Atsushi Shinoda, Sagamihara, all of Japan

[73] Assignee: Kabushiki Kaisha Kenwood, Tokyo, Japan

[21] Appl. No.: 08/889,575

[22] Filed: Jul. 8, 1997

[30] Foreign Application Priority Data

| Jul. 8, 1996 | [JP] | Japan | 8-195233 |
| Jul. 8, 1996 | [JP] | Japan | 8-195234 |
| Dec. 16, 1996 | [JP] | Japan | 8-352617 |
| Feb. 12, 1997 | [JP] | Japan | 9-041443 |

[51] Int. Cl.$^6$ .................................................. H04J 11/00
[52] U.S. Cl. .......................... 370/203; 375/200; 375/300; 375/320; 455/108
[58] Field of Search ................................. 370/203, 204, 370/205, 208; 375/300, 301, 320, 321, 200; 455/102, 103, 108, 109, 130, 164, 205, 210, 211, 296, 308, 309

[56] References Cited

U.S. PATENT DOCUMENTS

| 5,471,464 | 11/1995 | Ikeda | 370/203 |
| 5,559,828 | 9/1996 | Armstrong et al. | 375/200 |
| 5,581,578 | 12/1996 | De Bot | 375/261 |

*Primary Examiner*—Ajit Patel
*Assistant Examiner*—Bob A. Phunkulh
*Attorney, Agent, or Firm*—Sixbey, Friedman, Leedom & Ferguson, PC; Eric J. Robinson

[57] ABSTRACT

An apparatus for demodulating an AM data multiplexed modulated wave signal in which an analog modulated signal and digital modulated signals are multiplexed, in order to derive therefrom a baseband digital signal. The demodulation apparatus aims to derive the digital baseband signal from the AM data multiplexed modulated wave signal in which the analog modulated signal obtained by amplitude modulating a carrier having a frequency fc with an analog signal and the digital modulated signals at frequency position of (fc+fα) and (fc−fα) line-symmetrical with respect to a frequency axis of the frequency fc are multiplexed. A demodulation apparatus includes an AM type modulated wave signal eliminating circuit for removing an AM modulated wave signal from an input AM data multiplexed modulated wave signal, and a data demodulation circuit for receiving an output of the AM type modulated wave signal eliminating circuit and for deriving therefrom a baseband digital signal.

9 Claims, 8 Drawing Sheets

APPARATUS FOR DEMODULATING AM DATA MULTIPLEXED MODULATED WAVE SIGNAL

BACKGROUND OF THE INVENTION

1. Field of the Invention

The present invention relates to an apparatus for demodulating an AM data multiplexed modulated wave signal generated by an AM data multiplexing and modulating apparatus, to thereby obtain a baseband digital signal. More particularly, the invention relates to an apparatus for demodulating an AM data multiplexed modulated wave signal and deriving therefrom a baseband digital signal which wave signal is obtained through AM data multiplexing and modulating as the present inventor has proposed, by amplitude modulating a carrier having a frequency fc with an analog signal by an AM type modulator to multiplex digital modulated signals at frequency positions of (fc+fα) and (fc−fα) line symmetrical to the carrier having the frequency fc on the frequency axis.

2. Description of the Related Art

Conventional apparatuses for demodulating a data multiplexed modulated wave signal are classified mainly into time division multiplexing and frequency division multiplexing. For time division multiplexing, data is picked up by selecting a data multiplexed time, and for frequency division multiplexing, data is picked up by a data multiplexed frequency band.

However, an AM data multiplexed modulated wave signal, which is obtained through AM data multiplexing and modulating by amplitude modulating a carrier having a frequency fc with an analog signal by an AM type modulator to multiplex digital modulated signals at frequency positions of (fc+fα) and (fc−fα) line symmetrical to the carrier having the frequency fc on the frequency axis, has the AM type modulated components and data modulated components multiplexed in the same frequency band and at the same time. It is impossible to pick up desired data by selecting a data multiplexed time or a data multiplexed frequency band.

SUMMARY OF THE INVENTION

It is an object of the present invention to provide apparatuses of four types for demodulating an AM data multiplexed modulated wave signal to derive therefrom a baseband digital signal of a multiplexed digital modulated signal.

Each of the four types of the apparatus of this invention for demodulating an AM data multiplexed modulated wave signal has a function of demodulating an AM data multiplexed modulated wave signal to derive therefrom a baseband digital signal, the AM data multiplexed modulated wave signal being obtained through AM data multiplexing and modulating by amplitude modulating a carrier having a frequency fc with an analog signal by an AM type modulator to multiplex digital modulated signals at frequency positions of (fc+fα) and (fc−fα) line symmetrical to the carrier having the frequency fc on the frequency axis.

The apparatus of the first type for demodulating an AM data multiplexed modulated wave signal comprises: an AM type modulated wave signal eliminating circuit for removing an AM type modulated wave signal from an input AM data multiplexed modulated wave signal; and a data demodulation circuit for receiving an output of the AM type modulated wave signal eliminating circuit and deriving therefrom a baseband digital signal.

According to the apparatus of the first type for demodulating an AM data multiplexed modulated wave signal multiplexing digital modulated signals at frequency positions of (fc+fα) and (fc−fα) line symmetrical to the carrier having the frequency fc on the frequency axis, the AM type modulated wave signal eliminating circuit removes the AM type modulated wave signal from the AM data multiplexed modulated wave signal, to output a digital modulated signal. Upon reception of this digital modulated signal, the data demodulation circuit derives the baseband digital signal from the received digital modulated wave signal.

The AM type modulated wave signal eliminating circuit of the apparatus of the first type for demodulating an AM data multiplexed modulated wave signal comprises: a synchronization detector for synchronously detecting the AM data multiplexed modulated wave signal; an AM modulator for amplitude modulating the carrier having the frequency fc with an output signal of the synchronization detector; and a subtractor circuit for subtracting the AM modulated wave signal output from the AM type modulator from the AM data multiplexed modulated wave signal, wherein an output of the subtractor circuit is supplied to the data modulation circuit.

According to the apparatus of the first type for demodulating an AM data multiplexed modulated wave signal multiplexing digital modulated signals at frequency positions of (fc+fα) and (fc−fα) line symmetrical to the carrier having the frequency fc on the frequency axis, the AM data multiplexed modulated wave signal is synchronously detected to output an AM demodulation signal composed of frequency components on one side of the carrier frequency fc. This AM demodulation signal is modulated by the carrier having the frequency fc. The modulated wave signal is subtracted from the AM multiplexed modulated wave signal by the subtractor circuit. Therefore, this subtractor circuit outputs the digital modulated wave signal which is demodulated by the data demodulation circuit to obtain a baseband digital signal.

The AM type modulated wave signal eliminating circuit of the apparatus of the first type for demodulating an AM data multiplexed modulated wave signal comprises: a first frequency converter for frequency converting by mixing the AM data multiplexed modulated wave signal and a signal having a frequency fu; a second frequency converter for frequency converting by mixing the AM data multiplexed modulated wave signal and a signal having a frequency fl, where fu>fl and fu−fc=fc−fl; and a calculation circuit for calculating a difference between an output signal from the first frequency converter and an output signal from the second frequency converter, wherein an output of the calculation circuit is supplied to the data modulation circuit.

According to the apparatus of the first type for demodulating an AM data multiplexed modulated wave signal multiplexing digital modulated signals at frequency positions of (fc+fα) and (fc−fα) line symmetrical to the carrier having the frequency fc on the frequency axis, the AM data multiplexed modulated wave signal is mixed with the signal having the frequency fu to be frequency converted, and with the signal having the frequency fl to be frequency converted. The AM data multiplexed modulated wave signal mixed with the signal having the frequency fu and frequency converted is subjected to reversal of spectra for reversing the order of frequency spectra. A difference between frequency converted signals is calculated by the calculation circuit. The digital modulated wave signal output from the calculation circuit is demodulated to derive a baseband digital signal.

The data demodulation circuit of the apparatus of the first type for demodulating an AM data multiplexed modulated wave signal comprises: a filter for picking up frequency components higher than the frequency fc from an output signal from the AM type modulated wave signal eliminating circuit; and demodulating means responsive to an output signal from the filter for performing demodulation associated with data modulation.

According to the data demodulation circuit of the apparatus of the first type for demodulating an AM data multiplexed modulated wave signal, the digital modulated wave signals symmetrical to the frequency fc on the frequency axis output from the AM type modulated wave signal eliminating circuit is supplied to the data demodulation circuit. In this circuit, the filter picks up the frequency components higher than the frequency fc from the digital modulated wave signal to perform demodulation associated with digital modulation and derive a baseband digital signal from the digital modulated wave signal.

The data demodulation circuit of the apparatus of the first type for demodulating an AM data multiplexed modulated wave signal comprises: a filter for picking up frequency components lower than the frequency fc from an output signal from the AM type modulated wave signal eliminating circuit; and demodulating means responsive to an output signal from the filter for performing demodulation associated with data modulation.

According to the data demodulation circuit of the apparatus of the first type for demodulating an AM data multiplexed modulated wave signal, the digital modulated wave signals symmetrical to the frequency fc on the frequency axis output from the AM type modulated wave signal eliminating circuit is supplied to the data demodulation circuit. In this circuit, the filter picks up the frequency components lower than the frequency fc from the digital modulated wave signal to perform demodulation associated with digital modulation and derive a baseband digital signal from the digital modulated wave signal.

The data demodulation circuit of the apparatus of the first type for demodulating an AM data multiplexed modulated wave signal comprises: a first filter for picking up frequency components higher than the frequency fc from a digital modulated wave signal output from the AM type modulated wave signal eliminating circuit; first demodulating means responsive to an output signal from the first filter for performing demodulation associated with data modulation; a second filter for picking up frequency components lower than the frequency fc from a digital modulated wave signal output from the AM type modulated wave signal eliminating circuit; second demodulating means responsive to an output signal from the second filter for performing demodulation associated with data modulation; sign reversing means for reversing a sign of a demodulation output from the first or second demodulating means; and adding means for adding the demodulation output whose sign was reversed and the demodulation output whose sign was not reversed.

According to the data demodulation circuit of the apparatus of the first type for demodulating an AM data multiplexed modulated wave signal, the digital modulated wave signals symmetrical to the frequency fc on the frequency axis output from the AM type modulated wave signal eliminating circuit is supplied to the data demodulation circuit. In this circuit, the first filter picks up the frequency components higher than the frequency fc from the digital modulated wave signal, and the first demodulating means performs demodulation associated with digital modulation to derive a baseband digital signal from the digital modulated wave signal. The second filter picks up the frequency components lower than the frequency fc from the digital modulated wave signal, and the second demodulating means performs demodulation associated with digital modulation to derive a baseband digital signal from the digital modulated wave signal. The sign reversing means reverses the sign of the demodulation output of the first or second demodulating means, and the adding means adds the demodulation output whose sign was reversed and the demodulation output whose sign was not reversed to thereby output it as a demodulation signal.

The apparatus of the second type for demodulating an AM data multiplexed modulated wave signal comprises: a first orthogonal detector for orthogonally detecting the AM data multiplexed modulated wave signal with a signal having a frequency (fc+fα); a second orthogonal detector for orthogonally detecting the AM data multiplexed modulated wave signal with a signal having a frequency (fc−fα); first calculation means for calculating a difference between I components output from the first orthogonal detector and I components output from the second orthogonal detector; and second calculation means for calculating a difference between Q components output from the first orthogonal detector and Q components output from the second orthogonal detector.

According to the apparatus of the second type for demodulating an AM data multiplexed modulated wave signal multiplexing digital modulated signals at frequency positions of (fc+fα) and (fc−fα) line symmetrical to the carrier having the frequency fc on the frequency axis, the AM data multiplexed modulated wave signal is orthogonally detected with a signal having the frequency (fc+fα) by the first orthogonal detector, and orthogonally detected with a signal having the frequency (fc−fα) by the second orthogonal detector. The first calculation means calculates a difference between I components of the orthogonally detected output signals, and the second calculation means calculates a sum of Q components of the orthogonally detected output signals. During these calculations, amplitude modulation components are cancelled out so that a baseband digital signal of multiplexed data can be obtained.

The apparatus of the third type for demodulating an AM data multiplexed modulated wave signal comprises: A/D converting means for sampling the AM data multiplexed modulated wave signal when a level of the carrier becomes 0 and A/D converting the sampled signal; orthogonal detection means for orthogonally detecting an A/D converted and dispersed output signal with two orthogonal carrier signals having a frequency fα; and a low-pass filter for removing high frequency components of an orthogonally detected output.

According to the apparatus of the third type for demodulating an AM data multiplexed modulated wave signal, the AM data multiplexed modulated wave signal is sampled when the level of the carrier becomes 0, the sampled signal is A/D converted by the A/D converting means, the A/D converted and dispersed output signal is orthogonally detected with two orthogonal carrier signals having the frequency fc by the orthogonal detection means, and the high frequency components of the orthogonal detected output are removed by the low-pass filter to obtain a baseband digital signal. During this demodulation, since the AM data multiplexed modulated wave signal is sampled and A/D converted when the level of the carrier is 0, the multiplexed digital modulated wave signal is substantially derived and become equivalent to those signals sampled by the frequency fα. Accordingly, digital data multiplexed in the same frequency band and at the same time can be selectively extracted to obtain a baseband digital signal.

The apparatus of the fourth type for demodulating an AM data multiplexed modulated wave signal comprises: carrier reproduction means for reproducing the carrier from the AM data multiplexed modulated wave signal and shifting the phase of the reproduced carrier by $\pi/2$; multiplying means for multiplying an output from the carrier reproduction means by the AM data multiplexed modulated wave signal; orthogonal detection means for orthogonally detecting the multiplication output signal by two orthogonal carrier signals having a frequency $f\alpha$; and a low-pass filter for removing high frequency components of an orthogonally detected output.

According to the apparatus of the fourth type for demodulating an AM data multiplexed modulated wave signal, the carrier reproduction means reproduces a carrier orthogonal to the AM data multiplexed modulated wave signal, the multiplying means multiplies the reproduced carrier by the AM data multiplexed modulated wave signal, the orthogonal detection means orthogonally detects an output of the multiplying means with two orthogonal carrier signals having the frequency $f\alpha$, and the low pass-filter removes the high frequency components of the orthogonally detected output to thereby derive a baseband digital signal from the AM data multiplexed modulated wave signal multiplexing digital modulated signals.

DETAILED DESCRIPTION OF THE PREFERRED EMBODIMENTS

1st Type Demodulator Apparatus

An apparatus of a first type for demodulating an AM data multiplexed modulated wave signal will be described in connection with an embodiment of the present invention.

Figure 1:
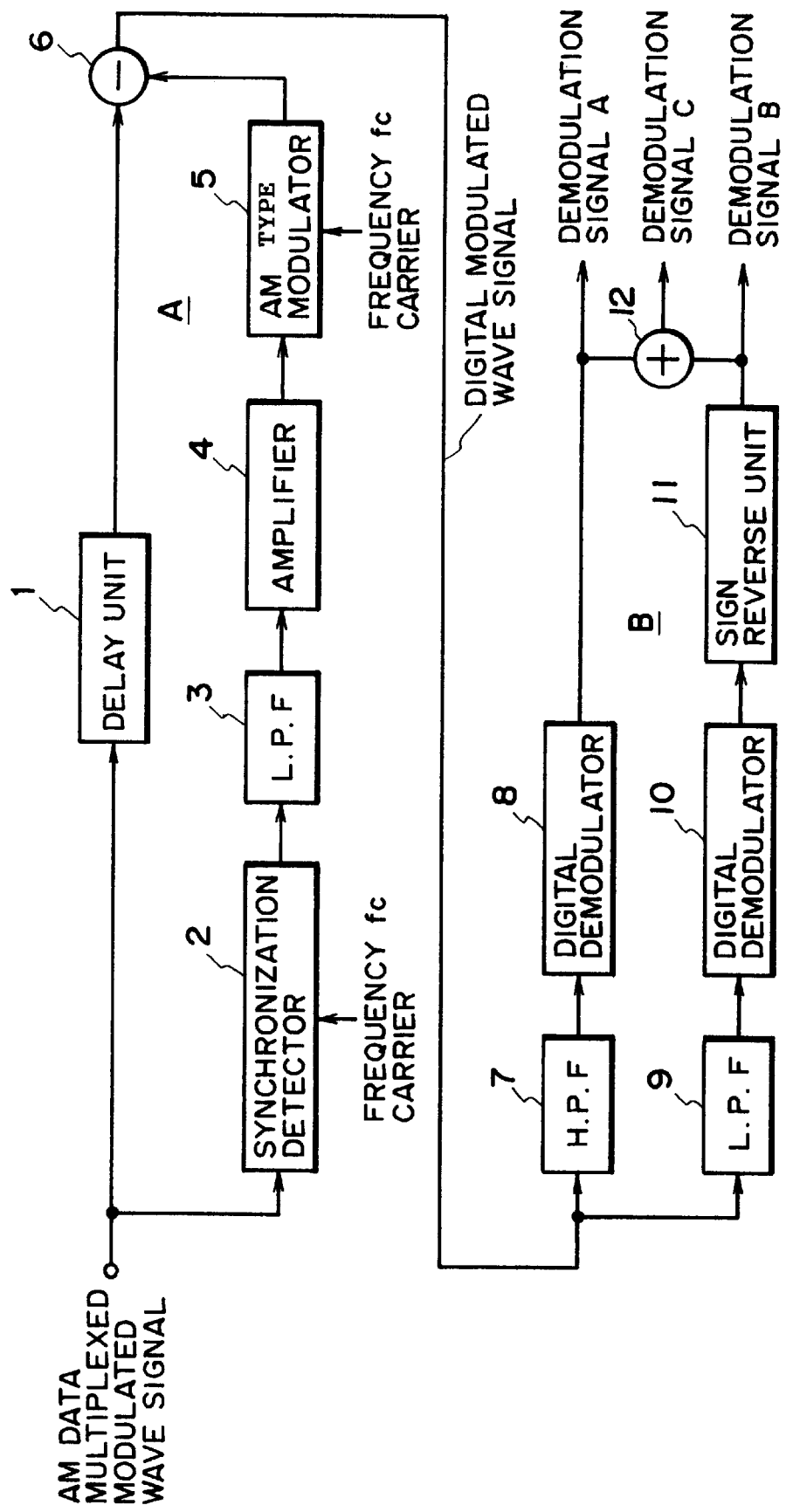
FIG. 1 is a block diagram showing the structure of an apparatus of a first type for demodulating an AM data multiplexed modulated wave signal according to an embodiment of the invention.

FIG. 1 is a block diagram showing the structure of the apparatus of the first type for demodulating an AM data multiplexed modulated wave signal. The apparatus of the first type for demodulating an AM data multiplexed modulated wave signal of this embodiment shown in FIG. 1 will be described by using QPSK (quadrature phase shift keying) modulation as digital modulation.

The apparatus of the first type for demodulating an AM data multiplexed modulated wave signal of this embodiment is constituted of an AM type modulated wave signal eliminating circuit A and a data demodulating circuit B. The AM type modulated wave signal eliminating circuit A eliminates AM type modulated wave signals contained in an AM data multiplexed modulated wave signal and extracts a digital modulated wave signal. The data demodulating circuit B demodulates the digital modulated wave signal output from the AM type modulated wave signal eliminating circuit A to obtain a baseband digital signal.

The AM modulated wave signal eliminating circuit A will be described first. An AM data multiplexed modulated wave signal is supplied to a delay unit 1 to delay it, and to a synchronization detector 2 supplied with a carrier having a frequency fc to detect it. A detected signal output from the synchronization detector 2 is supplied to a low-pass filter 3 to remove the high frequency components thereof and then to an amplifier 4 to amplify an output of the low-pass filter 3. The amplified output of the low-pass filter 3 is supplied to an AM type modulator supplied with a carrier having the frequency fc to AM type-modulate it. The AM data multiplexed modulated wave signal delayed by the delay unit 1 is subtracted by a subtractor 6 by the modulated wave signal output from the AM type modulator 5. A delay time given by the delay unit 1 is set to a total delay time of the synchronization detector 2, low-pass filter 3, amplifier 4 and AM modulator 5.

Next, the data modulator circuit B will be described. The data modulated wave signal output from the AM type modulated wave signal eliminating circuit A is supplied to a high-pass filter 7 which removes the frequency components thereof higher than the frequency fc. An output signal of the high-pass filter 7 is supplied to a digital demodulator 8 which demodulates the output in accordance with a method matching data modulation, to thereby obtain a demodulation signal A. The data modulated wave signal output from the AM modulated wave signal eliminating circuit A is supplied to a low-pass filter 9 which removes the frequency components thereof lower than the frequency fc. An output signal of the low-pass filter 9 is supplied to a digital demodulator 10 which demodulates the output in accordance with a method matching data modulation. An output of the digital modulator 10 is supplied to a sign reverse unit 11 to reverse its sign to thereby obtain a demodulation signal B. The demodulation signals A and B are supplied to an adder 12 to obtain a demodulation signal C. In the case of QPSK modulation, since the sign of I signal components only is reversed during modulation, only the sign of the I signal is reversed to recover the original sign.

An operation of the apparatus of the first type for demodulating an AM data multiplexed modulated wave signal constructed as above will be described.

Figure 7:
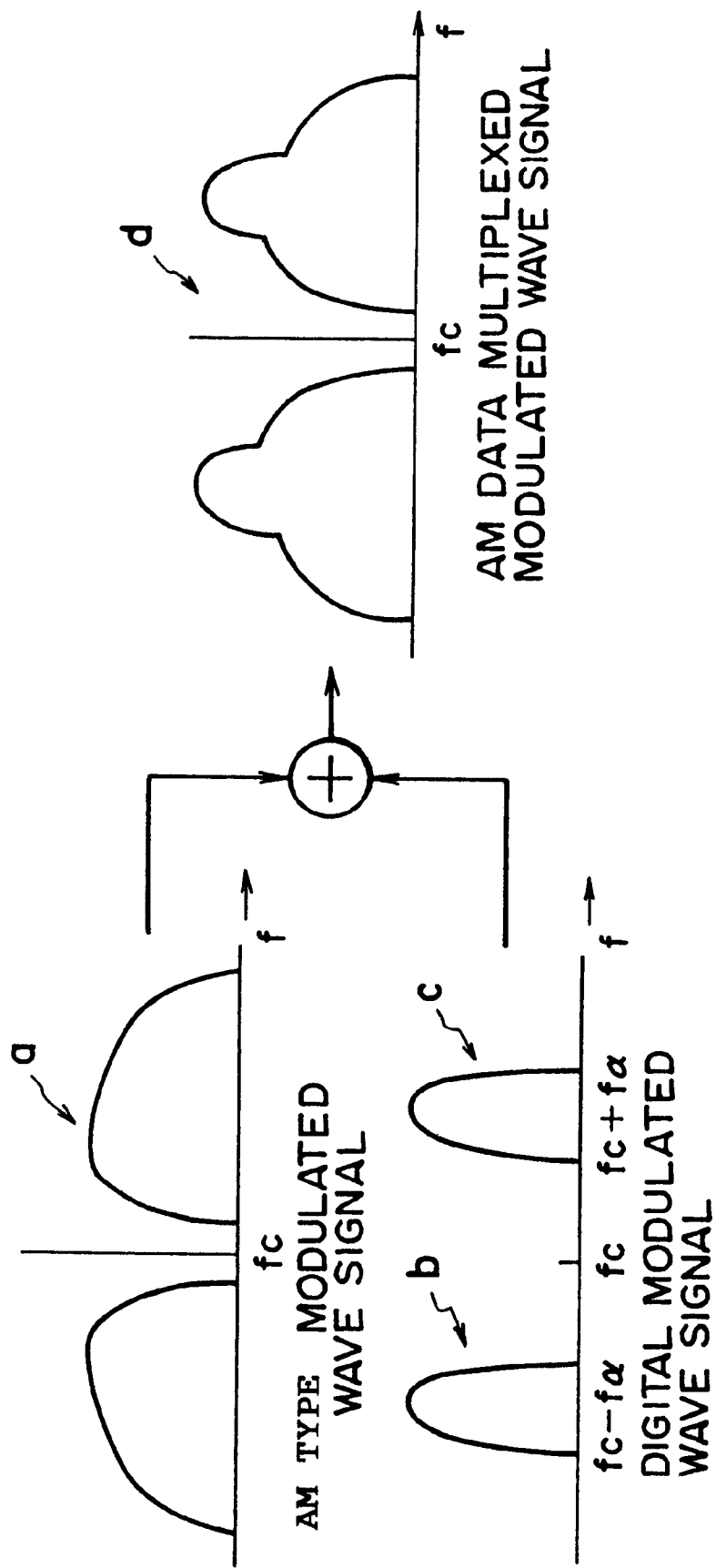
FIG. 7 is a schematic diagram illustrating an AM data multiplexed modulated wave signal input to the apparatus of the third type for demodulating an AM data multiplexed modulated wave signal according to the embodiment of the invention.

Prior to the description of demodulation, an AM data multiplexed modulated wave signal to be supplied to the demodulator will be described with reference to the frequency spectrum diagram shown in FIG. 7.

An AM type modulated wave signal vAM(t) obtained through modulation of a carrier by a signal wave is given by the following equation (1), assuming that the amplitude of a carrier is a unity "1", an angular frequency of the carrier is ωc(rad/s), a modulation factor is κ, and a signal wave is vm(t). The AM type modulated wave signal vAM(t) is indicated at a in FIG. 7.

$$vAM(t) = \{1 + \kappa vm(t)\}\cos \omega c t \quad (1)$$

I and Q digital signal trains generated by a QPSK baseband digital signal generator are represented by In and Qn. The digital signal train In, Qn is described also as a dibit, where:

In=±1

Qn=±1

An output signal from the QPSK baseband digital signal generator is branched to two circuit portions. One is supplied to an orthogonal modulator supplied with a carrier having a frequency (fc+fα) at which modulator a carrier having an angular frequency (ωc+ωα) (rad/s) is orthogonally modulated by a complex signal train. This orthogonal modulated wave vDH(t) is given by the following equation (2). The orthogonal modulated wave vDH(t) is indicated at c in FIG. 7.

$$vDH(t) = In \cos(\omega c + \omega\alpha)t + Qn \sin(\omega c + \omega\alpha)t \quad (2)$$

The other output of the QPSK baseband digital signal generator is supplied to a sign reverse unit to reverse the signs of the output signal In, Qn to (−In), (−Qn) which is converted into a complex conjugate (−In) by a complex conjugate unit. This complex signal train is supplied to an orthogonal modulator supplied with a carrier having a frequency (fc−fα) at which a carrier having an angular frequency (ωc−ωα) (rad/s) is orthogonally modulated by the complex signal train. This orthogonally modulated wave signal vDL(t) is given by the following equation (3). The orthogonally modulated wave signal vDL(t) is indicated at b in FIG. 7.

$$vDL(t) = -In \cos(\omega c - \omega\alpha)t + Qn \sin(\omega c - \omega\alpha)t \quad (3)$$

The output signals vDH(t) and vDL(t) of the equations (2) and (3) are added together, and this added digital modulated wave signal vD(t) is given by the following equation (4).

$$\begin{aligned} vD(t) &= vDH(t) + vDL(t) \\ &= In \cos(\omega c + \omega\alpha)t + Qn \sin(\omega c + \omega\alpha)t - \\ &\quad In \cos(\omega c - \omega\alpha)t + Qn \sin(\omega c - \omega\alpha)t \end{aligned} \quad (4)$$

The AM type modulated wave signal vAM(t) and digital modulated wave signal vD(t) are added together and output as an AM data multiplexed modulated wave signal. This AM data multiplexed modulated wave signal v(t) is given by the following equation (5) according to the equations (1) and (4). The AM data multiplexed modulated wave signal v(t) is indicated at d in FIG. 7.

$$\begin{aligned} v(t) &= vAM(t) + vD(t) \\ &= \{1 + \kappa vm(t)\} \cos \omega c t + \end{aligned} \quad (5)$$

-continued
$$\begin{aligned} & In \cos(\omega c + \omega\alpha)t + Qn \sin(\omega c + \omega\alpha)t - \\ & In \cos(\omega c - \omega\alpha)t + Qn \sin(\omega c - \omega\alpha)t \end{aligned}$$

ωα is an angular frequency (rad/s) which is a difference between the digital modulated carrier and AM type modulated carrier. The digital modulate carrier is symmetrically positioned in the upper and lower side waves of the AM modulated carrier, spaced by a frequency fα. The AM data multiplexed modulated wave signal given by the equation (5) is supplied to the AM type modulated wave signal eliminating circuit A. A process of eliminating the AM modulated wave signal contained in the AM data multiplexed modulated wave signal to be executed by the AM type modulated wave signal eliminating circuit A will be described in the following. The AM data multiplexed modulated wave signal v(t) is input to the delay unit 1 and to the synchronization detector 2.

For synchronization detection by the synchronization detector 2, an AM type modulated carrier cos ωct is multiplied to the equation (5). A synchronization detection output is given by the following equation (6).

$$\begin{aligned} 2\{v(t)\cos \omega ct\} &= \{1 + \kappa vm(t)\} + In \cos \omega\alpha t + Qn \sin \omega\alpha t - \\ & In \cos(-\omega\alpha)t + Qn \sin(-\omega\alpha)t + \\ & \{1 + \kappa vm(t)\}\cos 2\omega ct + In \cos(2\omega c + \omega\alpha)t + \\ & Qn \sin(2\omega c + \omega\alpha)t - In \cos(2\omega c - \omega\alpha)t + \\ & Qn \sin(2\omega c - \omega\alpha)t \end{aligned} \quad (6)$$

This synchronization detection output is supplied to the low-pass filter 3 to remove the high frequency components thereof. An output signal of the low-pass filter is given by the following equation (7).

$$\begin{aligned} 2\{v(t)\cos \omega ct\} &= \{1 + \kappa vm(t)\} + In \cos \omega\alpha t + Qn \sin \omega\alpha t - \\ & In \cos(-\omega\alpha)t + Qn \sin(-\omega\alpha)t \\ &= \{1 + \kappa vm(t)\} + In \cos \omega\alpha t + Qn \sin \omega\alpha t - \\ & In \cos \omega\alpha t - Qn \sin \omega\alpha t \end{aligned}$$

Therefore, $$v(t)\cos \omega ct = 1/2\{1 + \kappa vm(t)\} \quad (7)$$

A signal given by the equation (7) is amplified by the amplifier 4 and supplied to the AM type modulator 5 whereat the carrier having the frequency fc is AM type-modulated. An amplification factor of the amplifier 4 is assumed to be "2". After "2" is multiplied to the equation (7), an AM type modulated carrier cos ωct is multiplied for AM type modulation. An output of the AM type modulator 5, or AM type modulated wave signal vAM'(t), is given by the following equation (8).

$$vAM'(t) = \{1 + \kappa vm(t)\}\cos \omega ct \quad (8)$$

Next, the other signal of the branched AM data multiplexed modulated wave signal v(t) is delayed by the delay unit 1. The delay time of the delay unit 1 is a total delay time of the synchronization detector 2, low-pass filter 3, amplifier 4 and AM type modulator 5. For the simplicity purpose, the total delay time does not taken into consideration so that the delay time of the delay unit 1 is set to "0". Therefore, an output of the delay unit 1 is equivalent with the AM multiplexed signal v(t).

An output signal of the delay unit 1 and the AM type modulated wave signal vAM'(t) given by the equation (8) are input to the subtractor 6 to subtract the AM type modulated wave signal vAM'(t) from the output signal of the delay unit. An output signal vD(t) of the subtractor 6 is given by the equation (9).

$$vD(t) = v(t) - vAM'(t) \tag{9}$$
$$= In \cos(\omega c + \omega \alpha)t + Qn \sin(\omega c + \omega \alpha)t -$$
$$In \cos(\omega c - \omega \alpha)t + Qn \sin(\omega c - \omega \alpha)t$$

As seen from the equation (9), the AM type modulated wave signal eliminating circuit A can remove the AM type modulated wave signal from the AM data multiplexed modulated wave signal formed by using QPSK modulation as data modulation, and can extract only the multiplexed digital modulated wave signal.

Figure 2:
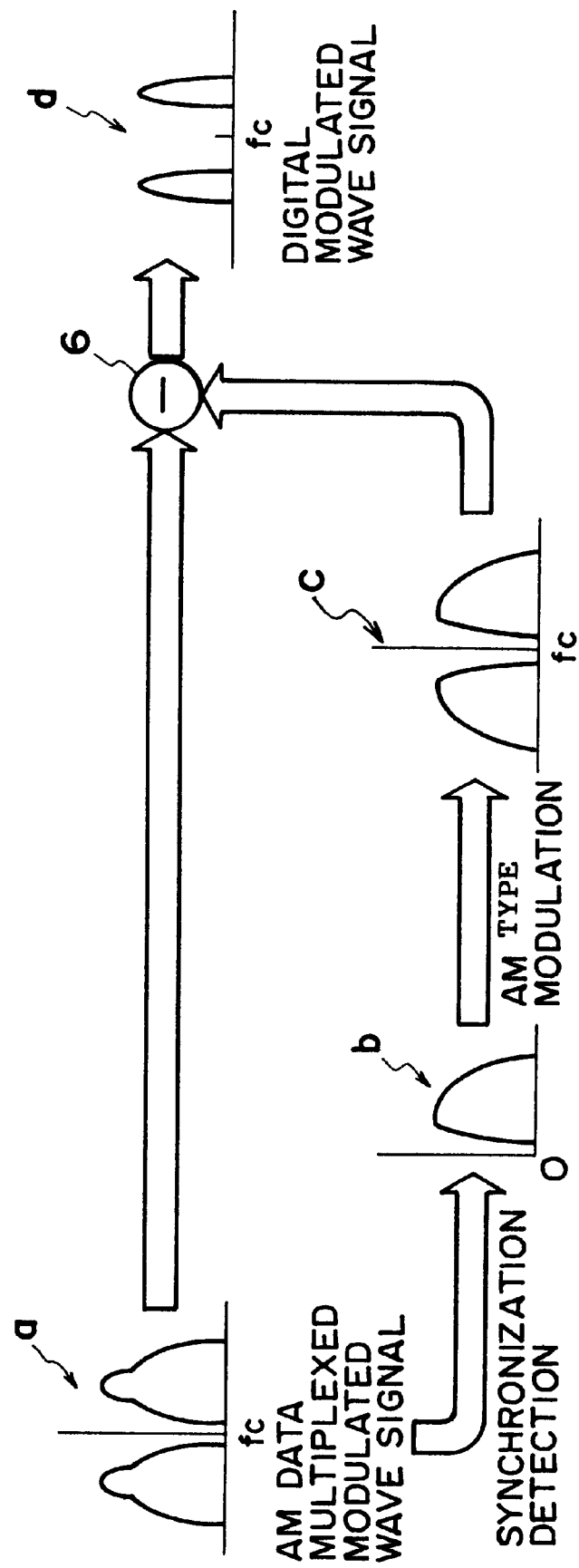
FIG. 2 is a schematic diagram illustrating the operation of an AM type modulated wave signal eliminating circuit of the apparatus of the first type for demodulating an AM data multiplexed modulated wave signal according to the embodiment of the invention.

An AM type modulated signal eliminating process by the AM type modulated signal eliminating circuit A of this embodiment constructed as above, is schematically shown in FIG. 2. In FIG. 2, the AM data multiplexed modulated wave signal input to the AM type modulated wave signal eliminating circuit A is indicated at a. The AM data multiplexed modulated wave signal is synchronously detected by the synchronization detector 2 to obtain a detection output signal indicated at b in FIG. 2 which is AM type-modulated by the AM type modulator 5 to obtain an AM type modulated wave signal indicated at C in FIG. 2. This AM type modulated wave signal output from the AM type modulator 5 is subtracted by the subtractor 6 from the AM data multiplexed modulated wave signal. Therefore, the AM type modulated wave signal is removed from the AM data multiplexed modulated wave signal and the subtractor outputs a digital modulated wave signal indicated at d in FIG. 2.

Next, demodulation of the digital modulated wave signal by the data demodulation circuit B will be described, the digital modulated wave signal being obtained by subtracting the AM type modulated wave signal from the AM data multiplexed modulated wave signal. An output signal of the subtractor 6, or digital modulated wave signal vD(t), is branched to two circuits. One is input to the high-pass filter 7 and the other is input to the low-pass filter 9.

Only the digital modulated signal higher than the frequency fc of the AM carrier passes through the high-pass filter 7 input with the digital modulated wave signal vD(t). Therefore, an output vDU(t) when the digital modulated wave signal vD(t) given by the equation (9) is input, is given by the following equation (10).

$$vDU(t)=In \cos(\omega c+\omega \alpha)t+Qn \sin(\omega c+\omega \alpha)t \tag{10}$$

The digital modulated wave signal vDU(t) given by the equation (10) is digitally demodulated (QPSK demodulated) at the digital demodulator 8 by the carrier $(\omega c+\omega \alpha)$ (rad/s). The outputs IA and QA which form the demodulation signal S are given by the equations (11) and (12).

$$IA=In \tag{11}$$
$$QA=Qn \tag{12}$$

Only the digital modulated signal lower than the frequency fc of the AM carrier passes through the low-pass filter 9 input with the digital modulated wave signal vD(t). Therefore, an output vDL(t) when the digital modulated wave signal vD(t) given by the equation (9) is input, is given by the following equation (13).

$$vDL(t)=-In \cos(\omega c-\omega \alpha)t+Qn \sin(\omega c-\omega \alpha)t \tag{13}$$

The digital modulated wave signal vDL(t) given by the equation (13) is digitally demodulated (QPSK demodulated) at the digital modulator 10 by the carrier $(\omega c-\omega \alpha)$ (rad/s) input to the digital demodulator 8. The outputs IB' and QB' are given by the equations (14) and (15).

$$IB'=-In \tag{14}$$
$$QB'=Qn \tag{15}$$

As described earlier, since the sign of only the I signal components of the low frequency digital modulated wave signal is reversed during AM data multiplexing and modulating, the sign of the I signal components is changed to the original sign by the sign reverse unit 11. The outputs IB and QB of the sign reverse unit 11 which form the demodulation signal B are given by the following equations (16) and (17).

$$IB=-IB'=In \tag{16}$$
$$QB=QB'=Qn \tag{17}$$

Next, the demodulation signals A and B are added together by the adder 12 to obtain the demodulation signal C (IC, QC) which is given by the following equations (18) and (19).

$$IC=IA+IB=2In \tag{18}$$
$$QC=QA+QB=2Qn \tag{19}$$

As above, the data demodulation circuit B can derive the digital data, i.e., baseband digital signal, from the digital modulated signal.

The demodulation signals A, B and C are all baseband digital signals, and the data demodulation circuit B demodulates the digital modulated signal to obtain the baseband digital signal. As apparent from the foregoing description, since baseband digital signals of three series are obtained, one of the baseband signal having the best reception state can be selectively used even if the components of the baseband digital signal of one series are degraded by radio wave interference or frequency fading.

Next, an apparatus of demodulating an AM data multiplexed modulated wave signal according to a first modification of the embodiment will be described.

Figure 3:
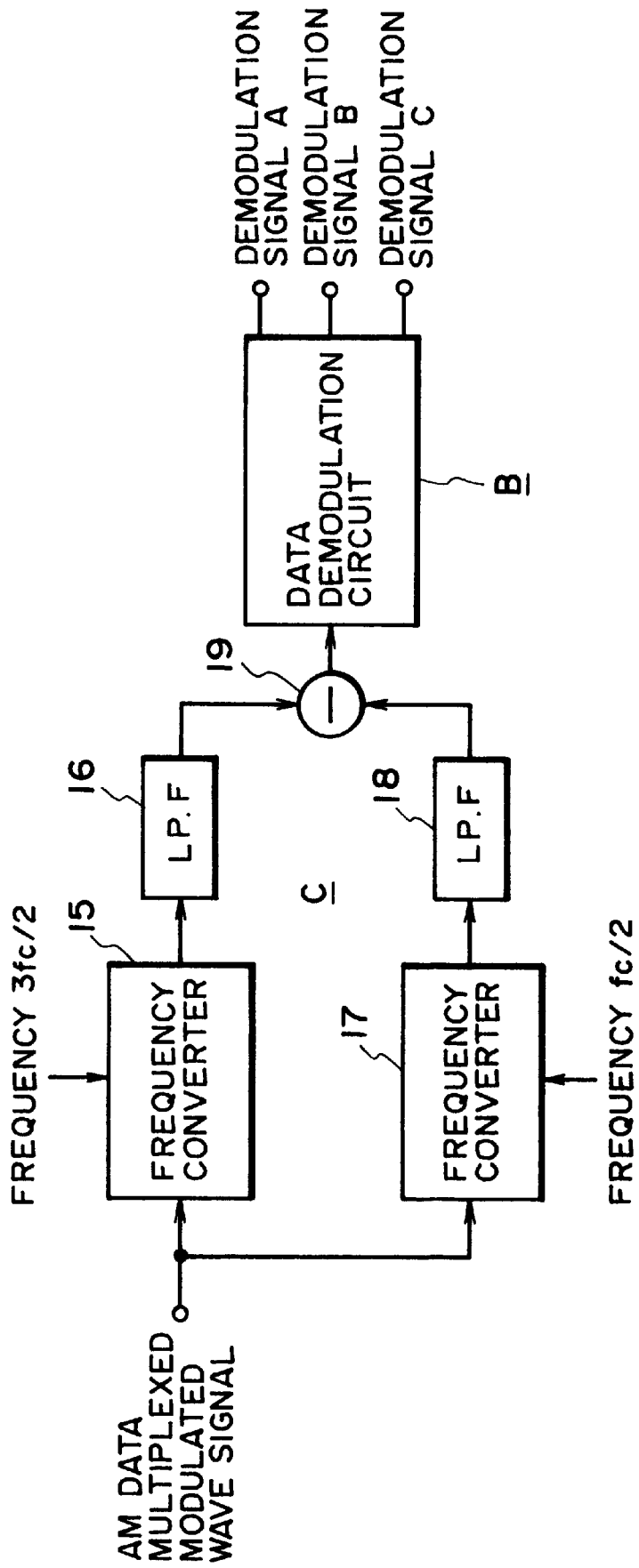
FIG. 3 is a block diagram showing the structure of an apparatus of the first type for demodulating an AM data multiplexed modulated wave signal according to a modification of the embodiment of the invention.

FIG. 3 is a block diagram showing the structure of the apparatus of demodulating an AM data multiplexed modulated wave signal according to the first modification of the embodiment. The apparatus of demodulating an AM data multiplexed modulated wave signal according to the first modification of the embodiment is constituted of an AM type modulated wave signal eliminating circuit C and a data demodulation circuit B.

The AM type modulated wave signal eliminating circuit C will be described. An AM data multiplexed modulated wave signal as well as a signal having an oscillation frequency (3fc/2) is supplied to a frequency converter 15 to convert the wave signal into a frequency which is one half of the carrier frequency fc. The frequency converted output is supplied to a low-pass filter 16 to remove the high frequency components thereof. The AM data multiplexed modulated wave signal as well as a signal having an oscillation frequency (fc/2) is supplied to a frequency converter 17 to convert the wave signal into a frequency which is one half of the carrier frequency fc. The frequency converted output is supplied to a low-pass filter 18 to remove the high frequency components thereof.

Therefore, the frequencies of output signals of the low-pass filters 16 and 18 are equal and supplied to a subtractor 19 which subtracts the output signal of the low-pass filter 18 from the output signal of the low-pass filter 16.

The operation of the AM modulated wave signal eliminating circuit C constructed as above according to the first modification will be described.

The AM data multiplexed modulated signal v(t) given by the equation (5) is frequency converted by a frequency converter 15 into a frequency which is one half the carrier frequency fc. Therefore, the AM data multiplexed modulated signal v(t) given by the equation (5) is multiplied by cos(ωc+ωc/2)t=cos 3/2·ωct. The multiplication result is given by:

$$2\{v(t)\cos 3/2 \cdot \omega ct\} = \{1 + \kappa\kappa m(t)\}\cos \omega ct/2 +$$
$$In \cos(\omega c/2 + \omega\alpha)t -$$
$$Qn \sin(\omega c/2 + \omega\alpha)t -$$
$$In \cos(\omega c/2 - \omega\alpha)t -$$
$$Qn \sin(\omega c/2 - \omega\alpha)t +$$
$$\{1 + \kappa\kappa m(t)\}\cos 5\omega c/2 \cdot t +$$
$$In \cos(5\omega c/2 + \omega\alpha)t -$$
$$Qn \sin(5\omega c/2 + \omega\alpha)t -$$
$$In \cos(5\omega c/2 - \omega\alpha)t +$$
$$Qn \sin(5\omega c/2 - \omega\alpha)t$$

The high frequency components (image components) of this signal are removed by the low-pass filter 16, the result vUPPER(t) being given by the following equation (20).

$$vUPPER(t) = 1/2\{1 + \kappa\kappa m(t)\}\cos \omega c/2 \cdot t + \quad (20)$$
$$1/2\{In \cos(\omega c/2 + \omega\alpha)t -$$
$$Qn \sin(\omega c/2 + \omega\alpha)t -$$
$$In \cos(\omega c/2 - \omega\alpha)t +$$
$$Qn \sin(\omega c/2 - \omega\alpha)t\}$$

The AM data multiplexed modulated signal v(t) given by the equation (5) is frequency converted by a frequency converter 17 into a frequency which is one half the carrier frequency fc. Therefore, the AM data multiplexed modulated signal v(t) given by the equation (5) is multiplied by cos(ωc/2)t. The multiplication result is given by:

$$2\{v(t)\cos (\omega c/2)t\} = \{1 + \kappa\kappa m(t)\}\cos(\omega c/2)t -$$
$$In \cos(\omega c/2 + \omega\alpha)t +$$
$$Qn \sin(\omega c/2 + \omega\alpha)t +$$
$$In \cos(\omega c/2 - \omega\alpha)t +$$
$$Qn \sin(\omega c/2 - \omega\alpha)t +$$
$$\{1 + \kappa\kappa m(t)\}\cos 3\omega c/2 \cdot t +$$
$$In \cos(3\omega c/2 + \omega\alpha)t +$$
$$Qn \sin(3\omega c/2 + \omega\alpha)t -$$
$$In \cos(3\omega c/2 - \omega\alpha)t +$$
$$Qn \sin(3\omega c/2 - \omega\alpha)t$$

The high frequency components (image components) of this signal are removed by the low-pass filter 18, the result vLOWER(t) being given by the following equation (21).

$$vLOWER(t) = 1/2\{1 + \kappa\kappa m(t)\}\cos \omega c/2 \cdot t + \quad (21)$$
$$1/2\{-In \cos(\omega c/2 + \omega\alpha)t +$$
$$Qn \sin(\omega c/2 + \omega\alpha)t +$$
$$In \cos(\omega c/2 - \omega\alpha)t +$$
$$Qn \sin(\omega c/2 - \omega\alpha)t\}$$

vLOWER is subtracted from vUPPER by the subtractor 19. This subtraction output is a digital modulated wave signal vD(t) which is given by the following equation (27).

$$vD(t) = vUPPER - vLOWER \quad (22)$$
$$= In \cos(\omega c/2 + \omega\alpha)t + Qn \sin(\omega c/2 + \omega\alpha)t -$$
$$In \cos(\omega c/2 - \omega\alpha)t + Qn \sin(\omega c/2 - \omega\alpha)t\}$$

As apparent from the equation (22), in the case of using QPSK modulation as data modulation, the AM type modulated wave signal eliminating circuit C removes the AM type modulated wave signal from the AM data multiplexed modulated wave signal to extract only the multiplexed digital modulated signal.

Figure 4:
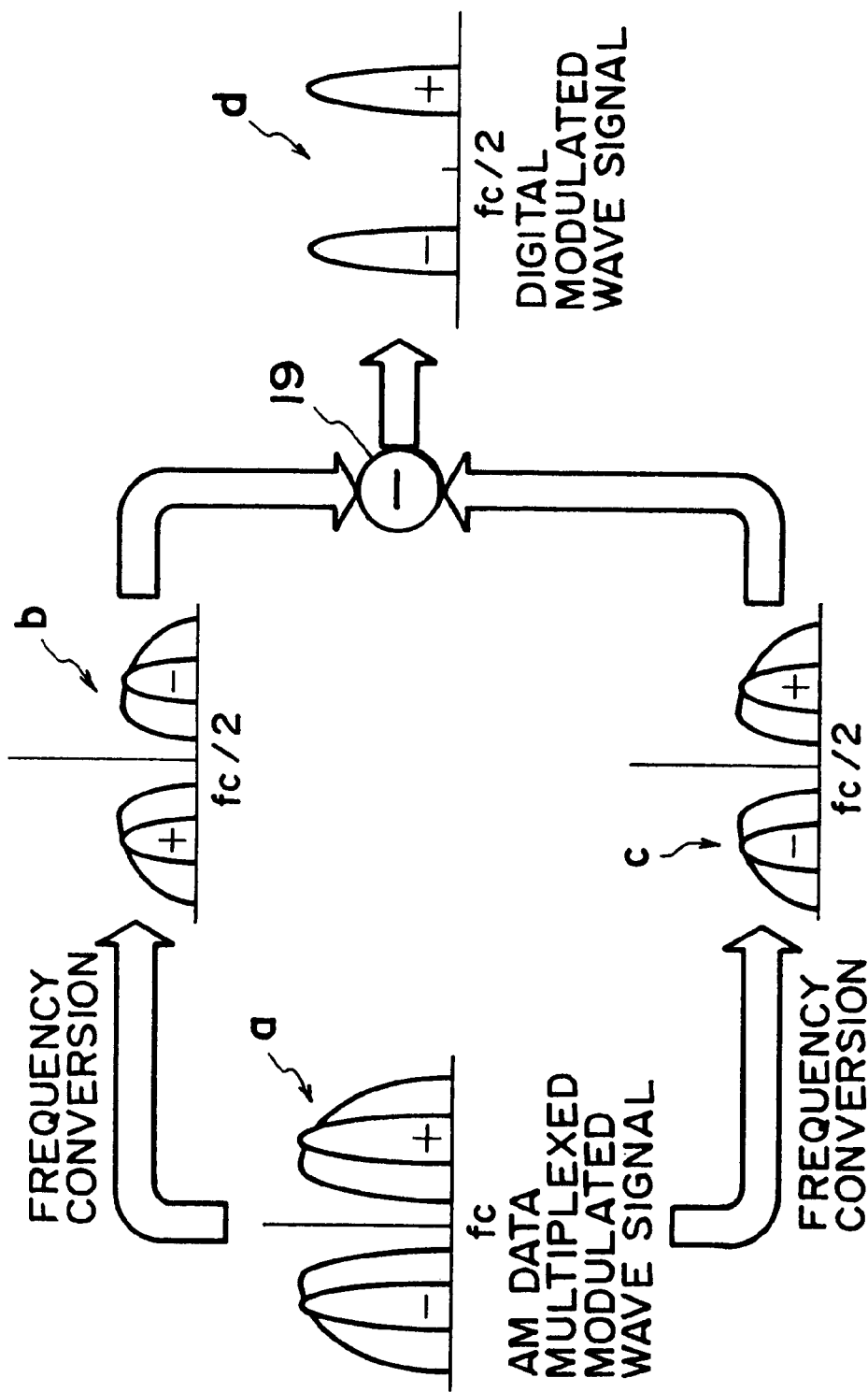
FIG. 4 is a schematic diagram illustrating the operation of an AM type modulated wave signal eliminating circuit of the apparatus of the first type for demodulating an AM data multiplexed modulated wave signal according to the modification of the embodiment of the invention.

An AM type modulated wave signal eliminating process by the AM type modulated wave signal eliminating circuit C is schematically shown in FIG. 4. In FIG. 4, the AM data multiplexed modulated wave signal input to the AM modulated wave signal eliminating circuit C is indicated at a. The AM data multiplexed modulated wave signal is frequency converted and filtered by the frequency converter 15 and low-pass filter 16 to obtain a frequency converted output signal indicated at b in FIG. 4. The AM data multiplexed modulated wave signal is frequency converted and filtered by the frequency converter 17 and low-pass filter 18 to obtain a frequency converted output signal indicated at c in FIG. 4. The frequency converted signal indicated at b in FIG. 4 is subtracted at the subtractor 19 by the frequency converted signal indicated at c in FIG. 4. Therefore, the AM type modulated wave signal is removed from the AM data multiplexed modulated wave signal to output from the subtractor 19 a digital modulated wave signal indicated at d shown in FIG. 4.

The digital modulated wave signal extracted by the AM type modulated wave signal eliminating circuit C has a different converted frequency from that of the digital modulated wave signal extracted by the AM type modulated wave signal eliminating circuit A. Therefore, the data demodulation circuit B is required to demodulate so as to match this different converted frequency. In supplying the digital modulated wave signal extracted by the AM type modulated wave signal eliminating circuit C to the demodulation circuit B and recovering the baseband digital signal, the frequency {(fc/2)+fα} of the carrier supplied to the digital demodulator 8 is converted into the frequency {(fc/2)−fα} of the carrier supplied to the digital demodulator 10.

Although in the AM type modulated wave signal eliminating circuit C, the frequency is converted into fc/2, it may be converted into a different frequency. In this case, the frequencies fu and fl are set so as to satisfy fu-fc=fc-fl, where the frequency fu is higher than the frequency fc and the frequency fl is higher than the frequency fc.

QPSK modulation as data modulation has been described above. Other modulation methods will be described.

ASK modulation as data modulation will be described. First, an AM data multiplexed modulated wave signal v(t) when using ASK modulation as data modulation will be described.

A carrier having the frequency fc is AM type modulated by the AM type modulator. An ASK baseband digital signal output from an ASK baseband digital signal generator is supplied to a first balanced modulator to balance modulate a carrier having the frequency (fc+fα) by the ASK baseband digital signal. At the same time, the ASK baseband digital signal output from the ASK baseband digital signal generator is supplied to a sign reverse unit to reverse its sign.

The ASK baseband digital signal whose sign was reversed by the sign reverse unit is supplied to a second balanced modulator to balance modulate a carrier having the frequency (fc−fα) by an output signal from the sign reverse unit. The output signals from the AM type modulator, first and second balanced modulators are added together to output the result as an AM data multiplexed modulated wave signal.

An AM type modulated wave signal vAM(t) output from the AM type modulator is given by the following equation (23), assuming that the amplitude of a carrier is a unity "1", an angular frequency of the carrier is ωc(rad/s), a modulation factor is κ, and a signal wave is vm(t).

$$vAM(t) = \{1 + \kappa \kappa m(t)\}\cos \omega c t \quad (23)$$

A signal train generated by the ASK baseband digital signal generator is represented by an which is 0 or 1.

This signal is branched to two circuit portions. One is supplied to the first balanced modulator supplied with the carrier having the frequency (fc+fα) to modulate the carrier of cos(ωc+ωα). An output signal vDH(t) from the first balanced modulator is given by:

$$vDH(t) = an \cos(\omega c + \omega \alpha)t \quad (24)$$

The sign of the other signal train an is reversed by the sign reverse unit to be converted into a signal train (−an). This signal train is supplied to the second balanced modulator supplied with the carrier having the frequency (fc−fα) to modulate the carrier of cos(ωc−ωα). An output signal vDL(t) from the second balanced modulator is given by:

$$vDL(t) = -an \cos(\omega c - \omega \alpha)t \quad (25)$$

The AM type modulated wave signals vDH(t) and vDL(t) are added together. This addition result, or digital modulated wave signal v(t), is given by:

$$vD(t) = vDH(t) + vDL(t) \quad (26)$$

$$= an \cos 2(\omega c + \omega \alpha)t - an \cos(\omega c - \omega \alpha)t$$

Next, the AM type modulated wave signal vAM(t) and digital modulated wave signal vD(t) are added together to obtain an AM data multiplexed modulated wave signal v(t) which is given by:

$$v(t) = vAM(t) + vD(t) \quad (27)$$

$$= \{1 + \kappa \kappa m(t)\}\cos \omega c t + an \cos 2(\omega c + \omega \alpha)t -$$

$$an \cos(\omega c - \omega \alpha)t$$

In the AM type modulated wave signal eliminating circuit C shown in FIG. 3, the AM data multiplexed modulated wave signal given by the equation (7) is input to the frequency converters 15 and 17. The frequency converter 15 frequency converts the AM data multiplexed modulated wave signal into a frequency which is one half the frequency fc. Therefore, cos(ωc+ω/2)t=cos 3ωc/2·t is multiplied to the equation (27) and the high frequency components are removed by the low-pass filter 16. Therefore, the term of the image components (frequency higher than the angular frequency ωc) can be omitted. The result signal vUPPER(t) is given by the following equation (28).

$$2 \, vUPPER(t) = 2\{v(t)\cos 3/2 \, \omega c(t)\}$$
$$= \{1 + \kappa \kappa m(t)\}\cos \omega c / 2 \cdot t -$$
$$an \cos 2(\omega c + \omega \alpha)t +$$
$$an \cos(\omega c / 2 - \omega \alpha)t$$

Therefore, $$vUPPER = 1/2 \, \{1 + \kappa \kappa m(t)\}\cos \omega c / 2 \cdot t + \quad (28)$$
$$1/2 \, \{-an \cos (\omega c / 2 + \omega \alpha)t +$$
$$an \cos (\omega c / 2 - \omega \alpha)t$$

The AM data multiplexed modulated wave signal given by the equation (7) input to the frequency converter 17 is frequency converted into a frequency which is one half the frequency fc. Therefore, cos(ωc/2)t is multiplied to v(t) given by the equation (27) and the high frequency components are removed by the low-pass filter 16. Therefore, the term of the image components (frequency higher than the angular frequency ωc) can be omitted. The result signal vLOWER(t) is given by the following equation (29).

$$2 \, vLOWER(t) = 2\{v(t)\cos \omega c / 2 \cdot t\}$$
$$= \{1 + \kappa \kappa m(t)\}\cos \omega c / 2 \cdot t +$$
$$an \cos\{(\omega c / 2) + \omega \alpha\}t -$$
$$an \cos\{(\omega c / 2) - \omega \alpha\}t$$

Therefore, $$vLOWER = 1/2 \, \{1 + \kappa \kappa m(t)\}\cos \omega c / 2 \cdot t + \quad (29)$$
$$1/2 \, \{an \cos ((\omega c / 2 + \omega \alpha)t -$$
$$an \cos ((\omega c / 2 - \omega \alpha) - \omega \alpha)t)$$

vLOWER(t) and vUPPER(t) are input to the subtractor 19 whose output is a digital modulated wave signal vD(t) which is given by the following equation (30).

$$vD(t) = vLOWER(t) - vUPPER(t) \quad (30)$$
$$= an \cos\{(\omega c / 2) + \omega \alpha\}t - an \cos\{(\omega c / 2) - \omega \alpha\}t$$

As apparent from the equation (30), in the case of using ASK modulation as data modulation, the AM type modulated wave signal eliminating circuit C removes the AM type modulated wave signal from the AM data multiplexed modulated wave signal to extract only the multiplexed digital modulated signal.

FSK modulation as data modulation will be described. First, an AM data multiplexed modulated wave signal v(t) when using FSK modulation as data modulation will be described.

A carrier having the frequency fc is modulated by the AM type modulator. An FSK baseband digital signal output from an FSK baseband digital signal generator is supplied to a first FSK modulator to FSK modulate a carrier $\cos(\omega c+\omega\alpha+\Delta\omega)t$ and a carrier $\cos(\omega c+\omega\alpha-\Delta\omega)t$ by the FSK baseband digital signal. At the same time, the FSK baseband digital signal is supplied to a sign reverse unit to reverse its sign.

The FSK baseband digital signal whose sign was reversed by the sign reverse unit is supplied to a second FSK modulator to FSK modulate a carrier $-\cos(\omega c-\omega\alpha+\Delta\omega)t$ and a carrier $-\cos(\omega c+\omega\alpha-\Delta\omega)t$ by an FSK baseband digital signal output from the sign reverse unit 19. The outputs of the AM type modulator and first and second FSK modulators are added together to output the result as an AM data multiplexed modulated wave signal v(t).

An AM type modulated wave signal vAM(t) output from the AM type modulator is given by the following equation (31), assuming that the amplitude of a carrier is a unity "1", an angular frequency of the carrier is ωc(rad/s), a modulation factor is κ, and a signal wave is vm(t).

$$vAM(t) = \{1+\kappa vm(t)\}\cos \omega ct \quad (31)$$

A signal train generated by the FSK baseband digital signal generator is represented by an which is ±1.

This signal train an is input to a first FSK modulator to modulate the carriers $\cos(\omega c+\omega\alpha+/-\Delta\omega)t$. An output signal vDH(t) from the first FSK modulator is given by:

$$vDH(t)=\cos(\omega c+\omega\alpha+\Delta\omega an)t \quad (32)$$

The sign of the signal train an is reversed by the sign reverse unit to be converted into a signal train (−an). This signal train is supplied to the second FSK modulator to modulate the carriers $-\cos(\omega c-\omega\alpha+/-\Delta\omega)t$. An output signal vDL(t) from the second FSK modulator is given by:

$$vDL(t)=-\cos(\omega c-\omega\alpha-\Delta\omega an)t \quad (33)$$

The signals vDH(t) and vDL(t) are added together. This addition result, or digital modulated wave signal vD(t), is given by:

$$vD(t) = vDH(t) + vDL(t) \quad (34)$$
$$= \cos(\omega c + \omega\alpha + \Delta\omega an)t - \cos(\omega c - \omega\alpha - \Delta\omega an)t$$

The AM type modulated wave signal vAM(t) and digital modulated wave signal vD(t) are added together to obtain an AM data multiplexed modulated wave signal v(t) which is given by:

$$v(t) = vAM(t) + vD(t) \quad (35)$$
$$= \{1 + \kappa vm(t)\}\cos\omega ct +$$
$$\cos(\omega c + \omega\alpha + \Delta\omega an)t - \cos(\omega c - \omega\alpha - \Delta\omega an)t$$

In the AM type modulated signal wave eliminating circuit C shown in FIG. 3, the AM data multiplexed modulated wave signal given by the equation (35) is input to the frequency converters 15 and 17. The frequency converter 15 frequency converts the AM data multiplexed modulated wave signal into a frequency which is one half the frequency fc. Therefore, $\cos(\omega c+\omega c/2)t = \cos 3\omega c/2\cdot t$ is multiplied to v(t) given by the equation (35) and the high frequency components are removed by the low-pass filter 16. Therefore, the term of the image components (frequency higher than the angular frequency ωc) can be omitted. The result signal vUPPER(t) is given by the following equation (36).

$$2\ vUPPER(t) = 2\{v(t)\cos 3\omega c/2 \cdot t\} = \{1 + \kappa\kappa m(t)\}\cos\omega c/2 \cdot t - \quad (36)$$
$$\cos(\omega c/2 + \Delta\omega an + \omega\alpha)t + \cos(\omega c/2 - \Delta\omega an - \omega\alpha)t$$

Therefore, $$vUPPER(t) = 1/2\{1 + \kappa\kappa m(t)\}\cos\omega c/2 \cdot t +$$
$$1/2\{-\cos(\omega c/2 + \Delta\omega an + \omega\alpha)t + \cos(\omega c/2 - \Delta\omega an - \omega\alpha)t\}$$

The AM data multiplexed modulated wave signal input to the frequency converter 17 is frequency converted into a frequency which is one half the frequency fc. Therefore, $\cos(\omega c/2)t$ is multiplied to v(t) and the high frequency components are removed by the low-pass filter 18. Therefore, the term of the image components (frequency higher than the angular frequency ωc) can be omitted. The result signal vLOWER(t) is given by the following equation (37).

$$2\ vLOWER(t) = 2\{v(t)\cos\omega c/2 \cdot t\} = \{1 + \kappa\kappa m(t)\}\cos\omega c/2 \cdot t + \quad (37)$$
$$\cos(\omega c/2 + \Delta\omega an + \omega\alpha)t - \cos(\omega c/2 - \Delta\omega an - \omega\alpha)t$$

Therefore, $$vLOWER(t) = 1/2\{1 + \kappa\kappa m(t)\}\cos\omega c/2 \cdot t +$$
$$1/2\{\cos(\omega c/2 + \Delta\omega an + \omega\alpha)t - \cos(\omega c/2 - \Delta\omega an - \omega\alpha)t\}$$

A difference between vLOWER(t) and vUPPER(t) is obtained by the subtractor 19 whose output is a digital modulated wave signal vD(t) which is given by the following equation (38).

$$vD(t) = vLOWER(t) - vUPPER(t) \quad (38)$$
$$= \cos(\omega c/2 + \Delta\omega an + \omega\alpha)t -$$
$$\cos(\omega c/2 - \Delta\omega an - \omega\alpha)t$$

As apparent from the equation (38), in the case of using FSK modulation as data modulation, the AM type modulated wave signal eliminating circuit C removes the AM type modulated wave signal from the AM data multiplexed modulated wave signal to extract only the multiplexed digital modulated signal.

Eight-phase PSK modulation as data modulation will be described. First, an AM data multiplexed modulated wave signal v(t) when using 8-phase PSK modulation as data modulation will be described.

A carrier having the frequency fc is modulated by the AM type modulator. The initial phase of a carrier $\cos(\omega c+\omega\alpha)t$ is shifted by (+π/8) radians and (−π/8) radians by first and second phase shifters. One of carriers output from the first and second phase shifters is selected in accordance with the phase of the PSK baseband digital signal (cn) among PSK baseband digital signals (an, bn, cn) output from an 8-phase PSK baseband digital signal generator. The selected carrier $\cos(\omega c+\omega\alpha)t$ and the dibits (an, bn) among the PSK baseband digital signals (an, bn, cn) are supplied to a first orthogonal modulator to orthogonally modulate the phase-shifted carrier $\cos(\omega c+\omega\alpha)t$ by the dibits (an, bn).

The signs of the 8-phase PSK baseband digital signals output from the 8-phase PSK baseband digital signal generator are reversed by a sign reverse unit. The sign reversed 8-phase PSK baseband digital signals (−an, −bn, −cn), i.e., the dibits (−an, −bn) among the tri-bit, are supplied to a complex conjugate unit to obtain a complex conjugate and convert into dibits (−an, bn). The initial phase of a carrier cos(ωc−ωα)t is shifted by (+π/8) radians and (−π/8) radians by third and fourth phase shifters. One of carriers output from the third and fourth phase shifters is selected in accordance with the phase of the PSK baseband digital signal (−cn) among the sign reversed 8-phase PSK baseband digital signals (−an, −bn, −cn). The selected carrier cos(ωc−ωα)t and the dibits (−an, bn) output from a complex conjugate unit are supplied to a second orthogonal modulator to orthogonally modulate the phase-shifted carrier cos(ωc−ωα)t by the dibits (−an, bn).

Output signals from the AM type modulator and first and second orthogonal modulators are added together by an adder from which output is an AM data multiplexed modulated wave signal.

An AM type modulated wave signal vAM(t) output from the AM type modulator is given by the following equation (39), assuming that the amplitude of a carrier is a unity "1", an angular frequency of the carrier is ωc(rad/s), a modulation factor is κ, and a signal wave is vm(t).

$$vAM(t) = \{1 + \kappa\kappa m(t)\}\cos\omega ct \quad (39)$$

A signal train generated by the 8-phase PSK baseband digital signal generator is represented by an, bn and cn where an, bn, cn is ±1.

A carrier cos{(ωc+ωα)t+(π/8)·cn} whose initial phase was selected in accordance with the phase of the PSK baseband digital signal (cn) is orthogonally modulated by the dibits (an, bn). This modulated output signal vDH(t) is given by the following equation (40).

$$vDH(t) = \quad (40)$$
$$an\cos\{(\omega c + \omega\alpha)t + (\pi/8) \cdot cn\} + bn\sin\{(\omega c + \omega\alpha)t + (\pi/8) \cdot cn\}$$

The signs of the tri-bit (an, bn, cn) are reversed to (−an, −bn, −cn). Of these, the dibits (−an, −bn) are converted by a complex conjugate unit into dibits (−an, bn).

A carrier cost(ωc−ωα)t−(π/8)·cn} whose initial phase was selected in accordance with the phase of the PSK baseband digital signal (−cn) is orthogonally modulated by the dibits (−an, bn). This modulated output signal vDL(t) is given by the following equation (41).

$$vDL(t) = -an\cos\{(\omega c - \omega\alpha)t - (\pi/8) \cdot cn\} + \quad (41)$$
$$bn\sin\{(\omega c - \omega\alpha)t - (\pi/8) \cdot cn\}$$

The signals vDH(t) and vDL(t) are added together. This addition result, or digital modulated wave signal vD(t), is given by the following equation (42).

$$vD(t) = vDH(t) + vDL(t) \quad (42)$$
$$= an\cos\{(\omega c + \omega\alpha)t + (\pi/8) \cdot cn\} +$$
$$bn\sin\{(\omega c + \omega\alpha)t + (\pi/8) \cdot cn\} -$$
$$an\cos\{(\omega c - \omega\alpha)t - (\pi/8) \cdot cn\} +$$
$$bn\sin\{(\omega c - \omega\alpha)t - (\pi/8) \cdot cn\}$$

The AM type modulated wave signal vAM(t) output from the AM type modulator and the digital modulated wave signal vD(t) are added together to obtain an AM data multiplexed modulated wave signal v(t) which is given by the following equation (43).

$$v(t) = vAM(t) + vD(t) \quad (43)$$
$$= \{1 + \kappa\kappa m(t)\}\cos\omega ct +$$
$$an\cos\{(\omega c + \omega\alpha)t + (\pi/8) \cdot cn\} +$$
$$bn\sin\{(\omega c + \omega\alpha)t + (\pi/8) \cdot cn\} -$$
$$an\cos\{(\omega c - \omega\alpha)t - (\pi/8) \cdot cn\} +$$
$$bn\sin\{(\omega c - \omega\alpha)t - (\pi/8) \cdot cn\}$$

In the AM type modulated signal wave eliminating circuit C shown in FIG. 3, the AM data multiplexed modulated wave signal given by the equation (43) is input to the frequency converters 15 and 17. The frequency converter 15 frequency converts the AM data multiplexed modulated wave signal into a frequency which is one half the frequency fc. Therefore, cos(ωc+ωc/2)t=cos 3ωc/2·t is multiplied to v(t) given by the equation (43) and the high frequency components are removed by the low-pass filter 16. Therefore, the term of the image components (frequency higher than the angular frequency ωc) can be omitted. The result signal vUPPER(t) is given by the following equation (44).

$$2\,vUPPER(t) = 2\{v(t)\cos 3\omega c/2 \cdot t\} \quad (44)$$
$$= \{1 + \kappa\kappa m(t)\}\cos\omega c/2 \cdot t -$$
$$an\cos\{(\omega c + \omega\alpha)t + (\pi/8) \cdot cn\} -$$
$$bn\sin\{(\omega c + \omega\alpha)t + (\pi/8) \cdot cn\} +$$
$$an\cos\{(\omega c - \omega\alpha)t - (\pi/8) \cdot cn\} -$$
$$bn\sin\{(\omega c - \omega\alpha)t - (\pi/8) \cdot cn\}$$

Therefore, $$vUPPER(t) = 1/2\{1 + \kappa\kappa m(t)\}\cos\omega c/2 \cdot t +$$
$$1/2[-an\cos\{((\omega c/2) + \omega\alpha)t + (\pi/8) \cdot cn\} -$$
$$bn\sin\{((\omega c/2 + \omega\alpha)t + (\pi/8) \times cn\}] +$$
$$1/2[an\cos\{((\omega c/2) - \omega\alpha)t - (\pi/8) \cdot cn\} -$$
$$bn\sin\{((\omega c/2) - \omega\alpha)t - (\pi/8) \cdot cn\}]$$

The AM data multiplexed modulated wave signal input to the frequency converter 17 is frequency converted into a frequency which is one half the frequency fc. Therefore, cos(ωc/2)t is multiplied to v(t) given by the equation (43) and the high frequency components are removed by the low-pass filter 18. Therefore, the term of the image components (frequency higher than the angular frequency ωc) can be omitted. The result signal vLOWER(t) is given by the following equation (45).

$$2\,vLOWER(t) = 2\{v(t)\cos\omega c/2 \cdot t\} \quad (45)$$
$$= \{1 + \kappa\kappa m(t)\}\cos\omega c/2 \cdot t +$$
$$an\cos\{((\omega c/2) + \omega\alpha)t + (\pi/8)\cdot cn\} +$$
$$bn\sin\{((\omega c/2) + \omega\alpha)t + (\pi/8)\cdot cn\} -$$
$$an\cos\{((\omega c/2) - \omega\alpha)t - (\pi/8)\cdot cn\} +$$
$$bn\sin\{((\omega c/2) - \omega\alpha)t - (\pi/8)\cdot cn\}$$

Therefore, $$vLOWER(t) = 1/2\{1 + \kappa\kappa m(t)\}\cos\omega c/2 \cdot t +$$
$$1/2[an\cos\{((\omega c/2) + \omega\alpha)t + (\pi/8)\cdot cn\} +$$
$$bn\sin\{((\omega c/2 + \omega\alpha)t + (\pi/8)\times cn\}] +$$
$$1/2[-an\cos\{((\omega c/2) - \omega\alpha)t - (\pi/8)\cdot cn\} +$$
$$bn\sin\{((\omega c/2) - \omega\alpha)t - (\pi/8)\cdot cn\}]$$

A difference between vLOWER(t) and vUPPER(t) is obtained by the subtractor 19 whose output is a digital modulated wave signal vD(t) which is given by the following equation (46).

$$vD(t) = vLOWER(t) - vUPPER(t) \quad (46)$$
$$= an\cos\{((\omega c/2) + \omega\alpha)t + (\pi/8)\cdot cn\} +$$
$$bn\sin\{((\omega c/2 + \omega\alpha)t + (\pi/8)\times cn\} -$$
$$an\cos\{((\omega c/2) - \omega\alpha)t - (\pi/8)\cdot cn\} +$$
$$bn\sin\{((\omega c/2) - \omega\alpha)t - (\pi/8)\cdot cn\}$$

As apparent from the equation (46), in the case of using 8-phase PSK modulation as data modulation, the AM type modulated wave signal eliminating circuit C removes the AM type modulated wave signal from the AM data multiplexed modulated wave signal to extract only the multiplexed digital modulated signal.

Sixteen-phase PSK modulation as data modulation will be described. First, an AM data multiplexed modulated wave signal v(t) when using 16-phase PSK modulation as data modulation will be described.

A carrier having the frequency fc is modulated by the AM type modulator. The initial phase of a carrier cos(ωc+ωα)t is shifted by (+π/8) radians and (−π/8) radians by first and second phase shifters. One of carriers output from the first and second phase shifters is selected in accordance with the phase of the PSK baseband digital signal (cn) among PSK baseband digital signals (an, bn, cn, dn) output from a 16-phase PSK baseband digital signal generator. The initial phase of the selected carrier cos(ωc+ωα)t is shifted by (+π/16) radians and (−π/16) radians by fifth and sixth phase shifters. One of carriers output from the fifth and sixth phase shifters is selected in accordance with the phase of the PSK baseband digital signal (dn) among the PSK baseband digital signals (an, bn, cn, dn) output from the 16-phase PSK baseband digital signal generator. The selected carrier cos (ωc+ωα)t and the dibits (an, bn) among the PSK baseband digital signals (an, bn, cn, dn) are supplied to a first orthogonal modulator to orthogonally modulate the phase-shifted carrier cos(ωc+ωα)t by the dibits (an, bn).

The signs of the 16-phase PSK baseband digital signals output from the 16-phase PSK baseband digital signal generator are reversed by a sign reverse unit. The sign reversed 16-phase PSK baseband digital signals (−an, −bn, −cn, −dn), i.e., the dibits (−an, −bn) are supplied to a complex conjugate unit to obtain a complex conjugate and convert into dibits (−an, bn). The initial phase of a carrier cos(ωc−ωα)t is shifted by (+π/8) radians and (−π/8) radians by third and fourth phase shifters. One of carriers output from the third and fourth phase shifters is selected in accordance with the phase of the PSK baseband digital signal (−cn) among the sign reversed 16-phase PSK baseband digital signals (−an, −bn, −cn, −dn). The initial phase of the selected carrier cos(ωc−ωα)t is shifted by (+π/16) radians and (−π/16) radians by seventh and eighth phase shifters. One of carriers output from the seventh and eighth phase shifters is selected in accordance with the phase of the PSK baseband digital signal (−dn) among the PSK baseband digital signals (−an, −bn, −cn, −dn) output from the 16-phase PSK baseband digital signal generator. The selected carrier cos(ωc+ωα)t and the dibits (−an, −bn) among the PSK baseband digital signals (−an, −bn, −cn, −dn) are supplied to a second orthogonal modulator to orthogonally modulate the phase-shifted carrier cos(ωc−ωα)t by the dibits (−an, bn).

An AM type modulated wave signal output from the AM type modulator and outputs from the first and second orthogonal modulators are added together by an adder from which output is an AM data multiplexed modulated wave signal.

An AM type modulated wave signal vAM(t) output from the AM type modulator is given by the following equation (47), assuming that the amplitude of a carrier is a unity "1", an angular frequency of the carrier is ωc(rad/s), a modulation factor is κ, and a signal wave is vm(t).

$$vAM(t) = \{1 + \kappa\kappa m(t)\}\cos\omega ct \quad (47)$$

A signal train generated by the 16-phase PSK baseband digital signal generator is represented by an, bn, cn and dn where an, bn, cn, dn is ±1.

A carrier cos{(ωc+ωα)t+(π/8)·cn+(π/16)·cn} whose initial phase was selected in accordance with the phase of the PSK baseband digital signals (cn) and (dn) is orthogonally modulated by the dibits (an, bn). This modulated output signal vDH(t) is given by the following equation (48).

$$vDH(t) = an\cos\{(\omega c + \omega\alpha)t + (\pi/8)\cdot cn + (\pi/16)\cdot dn\} + \quad (48)$$
$$bn\sin\{(\omega c + \omega\alpha)t + (\pi/8)\cdot cn + (\pi/16)\cdot dn\}$$

The signs of the PSK baseband digital signals (an, bn, cn, dn) are reversed by a sign reverse unit to (−an,−bn, −cn, −dn). Of these, the dibits (−an,−bn) are converted by a complex conjugate unit into dibits (−an, bn). A carrier cos{(ωc−ωα)t−(π/8)·cn} whose initial phase was selected in accordance with the phase of the PSK baseband digital signal (−cn), (−dn) is orthogonally modulated by the dibits (−an, bn). This modulated output signal vDL(t) is given by the following equation (49).

$$vDL(t) = -an\cos\{(\omega c - \omega\alpha)t - (\pi/8)\cdot cn - (\pi/16)\cdot dn\} + \quad (49)$$
$$bn\sin\{(\omega c - \omega\alpha)t - (\pi/8)\cdot cn - (\pi/16)\cdot dn\}$$

The signals vDH(t) and vDL(t) are added together by an adder. This addition result, or digital modulated wave signal vD(t), is given by the following equation (50).

$$vD(t) = vDH(t) + vDL(t) \quad (50)$$
$$= an\cos\{(\omega c + \omega\alpha)t + (\pi/8)\cdot cn + (\pi/16)\cdot dn\} +$$

-continued $$bn\sin\{(\omega c + \omega\alpha)t + (\pi/8)\cdot cn + (\pi/16)\cdot dn\} -$$
$$an\cos\{(\omega c - \omega\alpha)t - (\pi/8)\cdot cn - (\pi/16)\cdot dn\} +$$
$$bn\sin\{(\omega c - \omega\alpha)t - (\pi/8)\cdot cn - (\pi/16)\cdot dn\}$$

The AM type modulated wave signal vAM(t) output from the AM type modulator and the digital modulated wave signal vD(t) are added together to obtain an AM data multiplexed modulated wave signal v(t) which is given by the following equation (51).

$$v(t) = vAM(t) + vD(t) \tag{51}$$
$$= \{1 + \kappa\kappa m(t)\}\cos \omega ct +$$
$$an \cos\{(\omega c + \omega\alpha)t + (\pi/8)\cdot cn + (\pi/16)\cdot dn\} +$$
$$bn \sin\{(\omega c + \omega\alpha)t + (\pi/8)\cdot cn + (\pi/16)\cdot dn\} -$$
$$an \cos\{(\omega c - \omega\alpha)t - (\pi/8)\cdot cn - (\pi/16)\cdot dn\} +$$
$$bn \sin\{(\omega c - \omega\alpha)t - (\pi/8)\cdot cn - (\pi/16)\cdot dn\}$$

In the AM type modulated signal wave eliminating circuit C shown in FIG. 3, the AM data multiplexed modulated wave signal given by the equation (51) is input to the frequency converters 15 and 17. The frequency converter 15 frequency converts the AM data multiplexed modulated wave signal into a frequency which is one half the frequency fc. Therefore, $\cos(\omega c+\omega c/2)t=\cos 3\omega c/2\cdot t$ is multiplied to v(t) given by the equation (51) and the high frequency components are removed by the low-pass filter 16. Therefore, the term of the image components (frequency higher than the angular frequency ωc) can be omitted. The result signal vUPPER(t) is given by the following equation (52).

$$2\ vUPPER(t) = 2\{v(t)\cos 3\omega c/2\cdot t\}$$
$$= \{1 + \kappa\kappa m(t)\}\cos \omega c/2\cdot t -$$
$$an \cos\{((\omega c/2) + \omega\alpha)t + (\pi/8)\cdot cn + (\pi/16)\cdot dn\} -$$
$$bn \sin\{((\omega c/2) + \omega\alpha)t + (\pi/8)\cdot cn + (\pi/16)\cdot dn\} +$$
$$an \cos\{((\omega c/2) - \omega\alpha)t - (\pi/8)\cdot cn - (\pi/16)\cdot dn\} -$$
$$bn \sin\{((\omega c/2) - \omega\alpha)t - (\pi/8)\cdot cn - (\pi/16)\cdot dn\}$$

Therefore, $$vUPPER(t) = 1/2\{1 + \kappa\kappa m(t)\}\cos \omega c/2\cdot t + \tag{52}$$
$$1/2[-an \cos\{((\omega c/2) + \omega\alpha)t + (\pi/8)\cdot cn +$$
$$(\pi/16)\cdot dn\} - bn \sin\{((\omega c/2) + \omega\alpha)t +$$
$$(\pi/8)\times cn + (\pi/16)\cdot dn\}] +$$
$$1/2[an \cos\{((\omega c/2) - \omega\alpha)t - (\pi/8)\cdot cn -$$
$$(\pi/16)\cdot dn\} - bn \sin\{((\omega c/2) - \omega\alpha)t -$$
$$(\pi/8)\cdot cn - (\pi/16)\cdot dn\}]$$

The AM data multiplexed modulated wave signal input to the frequency converter 17 is frequency converted into a frequency which is one half the frequency fc. Therefore, $\cos(\omega c/2)t$ is multiplied to v(t) given by the equation (50) and the high frequency components are removed by the low-pass filter 18. Therefore, the term of the image components (frequency higher than the angular frequency ωc) can be omitted. The result signal vLOWER(t) is given by the following equation (53).

$$2\ vLOWER(t) = 2\{v(t)\cos \omega c/2\cdot t\}$$
$$= \{1 + \kappa\kappa m(t)\}\cos \omega c/2\cdot t +$$
$$an \cos\{((\omega c/2) + \omega\alpha)t + (\pi/8)\cdot cn + (\pi/16)\cdot dn\} +$$
$$bn \sin\{((\omega c/2) + \omega\alpha)t + (\pi/8)\cdot cn + (\pi/16)\cdot dn\} -$$
$$an \cos\{((\omega c/2) - \omega\alpha)t - (\pi/8)\cdot cn - (\pi/16)\cdot dn\} +$$
$$bn \sin\{((\omega c/2) - \omega\alpha)t - (\pi/8)\cdot cn - (\pi/16)\cdot dn\}$$

Therefore, $$vLOWER(t) = 1/2\{1 + \kappa\kappa m(t)\}\cos \omega c/2\cdot t + \tag{53}$$
$$1/2[an \cos\{((\omega c/2) + \omega\alpha)t + (\pi/8)\cdot cn +$$
$$(\pi/16)\cdot dn\} + bn \sin\{((\omega c/2) + \omega\alpha)t + (\pi/8)\cdot cn +$$
$$(\pi/16)\cdot dn\}] +$$
$$1/2[-an \cos\{((\omega c/2) - \omega\alpha)t - (\pi/8)\cdot cn -$$
$$(\pi/16)\cdot dn\} + bn \sin\{((\omega c/2) - \omega\alpha)t - (\pi/8)\cdot cn -$$
$$(\pi/16)\cdot dn\}]$$

A difference between vLOWER(t) and vUPPER(t) is obtained by the subtractor 19 whose output is a digital modulated wave signal vD(t) which is given by the following equation (54).

$$vD(t) = vLOWER(t) - vUPPER(t) \tag{54}$$
$$= an \cos\{((\omega c/2) + \omega\alpha)t + (\pi/8)\cdot cn + (\pi/16)\cdot dn\} +$$
$$bn \sin\{((\omega c/2) + \omega\alpha)t + (\pi/8)\times cn + (\pi/16)\cdot dn\} -$$
$$an \cos\{((\omega c/2) - \omega\alpha)t - (\pi/8)\cdot cn - (\pi/16)\cdot dn\} +$$
$$bn \sin\{((\omega c/2) - \omega\alpha)t - (\pi/8)\cdot cn - (\pi/16)\cdot dn\}$$

As apparent from the equation (54), in the case of using 16-phase PSK modulation as data modulation, the AM type modulated wave signal eliminating circuit C removes the AM type modulated wave signal from the AM data multiplexed modulated wave signal to extract only the multiplexed digital modulated signal.

Quadrature phase PSK modulation as data modulation using multi-carriers will be described. First, an AM data multiplexed modulated wave signal v(t) when using quadrature phase PSK modulation as data modulation using multi-carriers will be described.

A carrier having the frequency fc is modulated by the AM type modulator. The quadrature PSK baseband digital signals (I1n, Q1n, I2n, Q2n) generated by a quadrature phase PSK baseband digital signal generator are divided into two portions. The quadrature phase PSK baseband digital signals (I1n, Q1n) and a carrier cos(ωc+ωα) are supplied to a first orthogonal modulator to orthogonally modulate the carrier cos(ωc+ωα) by the quadrature phase PSK baseband digital signals (I1n, Q1n). Similarly, the quadrature phase PSK baseband digital signals (I2n, Q2n) and a carrier cos(ωc+ωα) are supplied to a second orthogonal modulator to orthogonally modulate the carrier cos(ωc+ωβ) by the quadrature phase PSK baseband digital signals (I2n, Q2n).

The quadrature phase PSK baseband digital signals (I1n, Q1n, I2n, Q2n) are supplied to a sing reverse unit to convert them into the quadrature phase PSK baseband digital signals (-I1n, -Q1n, -I2n, -Q2n). The sign converted quadrature phase PSK baseband digital signals (-I1n, -Q1n, -I2n, -Q2n) are supplied to a complex conjugate unit to convert them into the quadrature phase PSK baseband digital signals (-I1n, Q1n, -I2n, Q2n).

The quadrature phase PSK baseband digital signals (-I1n, Q1n) and (-I2n, Q2n) are branched to two circuit portions. The quadrature phase PSK baseband digital signals (-I1n, Q1n) and carrier cos(ωc−ωα)t are supplied to a third orthogonal modulator to orthogonally modulate the carrier cos(ωc−ωα)t by the quadrature phase PSK baseband digital signals (−I1n, Q1n). Similarly, the quadrature phase PSK baseband digital signals (−I2n, Q2n) and carrier cos(ωc−ωβ)t are supplied to a fourth orthogonal modulator to orthogonally modulate the carrier cos(ωc−ωβ)t by the quadrature phase PSK baseband digital signals (−I2n, Q2n).

An output signal from the AM type modulator and output signals from the first to fourth orthogonal modulators are added together to output it as an AM data multiplexed modulated wave signal.

An AM type modulated wave signal vAM(t) output from the AM type modulator is given by the following equation (55), assuming that the amplitude of a carrier is a unity "1", an angular frequency of the carrier is ωc(rad/s), a modulation factor is κ, and a signal wave is vm(t).

$$vAM(t) = \{1 + \kappa\kappa m(t)\}\cos \omega ct \quad (55)$$

PSK baseband digital signals generated by the quadrature phase baseband digital signal generator are represented by I1n, Q1n, I2n, and Q2n which are each takes ±1.

The PSK baseband digital signals I1n and Q1n and carrier cos(ωc+ωα)t are orthogonally modulated and the PSK baseband digital signals I1n and Q1n and carrier cos(ωc+ωβ)t are orthogonally modulated. A composite output signal of both the orthogonally modulated signals is represented by vDH(t) which is given by the following equation (56).

$$vDH(t) = I1n \cos(\omega c + \omega\alpha)t + Q1n \sin(\omega c + \omega\alpha)t + \quad (56)$$
$$I2n \cos(\omega c + \omega\beta)t + Q2n \sin(\omega c + \omega\beta)t$$

The signs of the quadrature phase PSK baseband digital signals (I1n, Q1n, I2n, Q2n) are reversed by a sign reverse unit into signals (−I1n, −Q1n, −I2n, −Q2n) which are then converted by a complex conjugate unit into signals (−I1n, Q1n, −I2n, Q2n). The PSK baseband digital signals (−I1n, −Q1n) and carrier cos(ωc−ωα)t are orthogonally modulated and the PSK baseband digital signals (−I2n, Q2n) and carrier cos(ωc−ωβ)t are orthogonally modulated. A composite output signal of both the orthogonally modulated signals is represented by vDL(t) which is given by the following equation (57).

$$vDL(t) = -I1n \cos(\omega c - \omega\alpha)t + Q1n \sin(\omega c - \omega\alpha)t - \quad (57)$$
$$I2n \cos(\omega c - \omega\beta)t + Q2n \sin(\omega c - \omega\beta)t$$

The signals vDH(t) and vDL(t) are added together by an adder. This addition result, or digital modulated wave signal vD(t), is given by the following equation (58).

$$vD(t) = vDH(t) + vDL(t) \quad (58)$$
$$= I1n \cos(\omega c + \omega\alpha)t + Q1n \sin(\omega c + \omega\alpha)t +$$
$$I2n \cos(\omega c + \omega\beta)t + Q2n \sin(\omega c + \omega\beta)t -$$
$$I1n \cos(\omega c - \omega\alpha)t + Q1n \sin(\omega c - \omega\alpha)t -$$
$$I2n \cos(\omega c - \omega\beta)t + Q2n \sin(\omega c - \omega\beta)t$$

The AM type modulated wave signal vAM(t) and the digital modulated wave signal vD(t) are added together to obtain an AM data multiplexed modulated wave signal v(t) which is given by the following equation (59).

$$v(t) = vAM(t) + vD(t) \quad (59)$$
$$= \{1 + \kappa\kappa m(t)\}\cos \omega ct +$$
$$I1n \cos(\omega c + \omega\alpha)t + Q1n \sin(\omega c + \omega\alpha)t +$$
$$I2n \cos(\omega c + \omega\beta)t + Q2n \sin(\omega c + \omega\beta)t -$$
$$I1n \cos(\omega c - \omega\alpha)t + Q1n \sin(\omega c - \omega\alpha)t -$$
$$I2n \cos(\omega c - \omega\beta)t + Q2n \sin(\omega c - \omega\beta)t$$

In the AM type modulated signal wave eliminating circuit C shown in FIG. 3, the AM data multiplexed modulated wave signal given by the equation (59) is input to the frequency converters 15 and 17. The frequency converter 15 frequency converts the AM data multiplexed modulated wave signal into a frequency which is one half the frequency fc. Therefore, cos(ωc+wc/2)t=cos 3ωc/2·t is multiplied to v(t) given by the equation (59) and the high frequency components are removed by the low-pass filter 16. Therefore, the term of the image components (frequency higher than the angular frequency ωc) can be omitted. The result signal vUPPER(t) is given by the following equation (60).

$$2 \, vUPPER(t) = 2\{v(t)\cos 3\omega c/2 \cdot t\}$$
$$= \{1 + \kappa\kappa m(t)\}\cos \omega c/2 \cdot t - I1n \cos(\omega c/2 + \omega\alpha)t -$$
$$Q1n \sin(\omega c/2 + \omega\alpha)t - I2n \cos(\omega c/2 + \omega\beta)t +$$
$$Q2n \sin(\omega c/2 + \omega\beta)t + I1n \cos(\omega c/2 - \omega\alpha)t -$$
$$Q1n \sin(\omega c/2 - \omega\alpha)t + I2n \cos(\omega\beta/2 - \omega\beta)t -$$
$$Q2n \sin(\omega\beta/2 - \omega\beta)t$$

Therefore, $$vUPPER(t) = 1/2\{1 + \kappa\kappa m(t)\}\cos \omega c/2 \cdot t + \quad (60)$$
$$1/2\{-I1n \cos(\omega c/2 + \omega\alpha)t -$$
$$Q1n \sin(\omega c/2 + \omega\alpha)t - I2n \cos(\omega c/2 + \omega\beta)t -$$
$$Q2n \sin(\omega c/2 + \omega\beta)t\} +$$
$$1/2\{I1n \cos(\omega c/2 - \omega\alpha)t - Q1n \sin(\omega c/2 - \omega\alpha)t +$$
$$I2n \cos(\omega\beta/2 - \omega\beta)t - Q2n \sin(\omega\beta/2 - \omega\beta)t$$

The AM data multiplexed modulated wave signal input to the frequency converter 17 is frequency converted into a frequency which is one half the frequency fc. Therefore, cos(ωc/2)t is multiplied to v(t) given by the equation (59) and the high frequency components are removed by the low-pass filter 18. Therefore, the term of the image components (frequency higher than the angular frequency ωc) can be omitted. The result signal vLOWER(t) is given by the following equation (61).

$$2 \, vLOWER(t) = 2\{v(t)\cos 3\omega c/2 \cdot t\}$$
$$= \{1 + \kappa\kappa m(t)\}\cos \omega c/2 \cdot t + I1n \cos(\omega c/2 + \omega\alpha)t +$$
$$Q1n \sin(\omega c/2 + \omega\alpha)t + I2n \cos(\omega c/2 + \omega\beta)t +$$
$$Q2n \sin(\omega c/2 + \omega\beta)t - I1n \cos(\omega c/2 - \omega\alpha)t +$$
$$Q1n \sin(\omega c/2 - \omega\alpha)t - I2n \cos(\omega\beta/2 - \omega\beta)t +$$
$$Q2n \sin(\omega\beta/2 - \omega\beta)t$$

Therefore,

-continued $$vLOWER(t) = 1/2\{1 + \kappa\kappa m(t)\}\cos \omega c/2 \cdot t + \qquad (61)$$
$$1/2\{I1n \cos(\omega c/2 + \omega\alpha)t +$$
$$Q1n \sin(\omega c/2 + \omega\alpha)t + I2n \cos(\omega c/2 + \omega\beta)t +$$
$$Q2n \sin(\omega c/2 + \omega\beta)t\} +$$
$$1/2\{-I1n \cos(\omega c/2 - \omega\alpha)t +$$
$$Q1n \sin(\omega c/2 - \omega\alpha)t - I2n \cos(\omega\beta/2 - \omega\beta)t +$$
$$Q2n \sin(\omega\beta/2 - \omega\beta)t$$

A difference between vLOWER(t) and vUPPER(t) is calculated. This difference is output as a digital modulated wave signal vD(t) which is given by the following equation (62).

$$vd(T) = vLOWER(t) - vupper(t) \qquad (62)$$
$$= I1n \cos(\omega c + \omega\alpha)t + Q1n \sin(\omega c + \omega\alpha)t +$$
$$I2n \cos(\omega c + \omega\beta)t + Q2n \sin(\omega c + \omega\beta)t -$$
$$I1n \cos(\omega c - \omega\alpha)t + Q1n \sin(\omega c - \omega\alpha)t -$$
$$I2n \cos(\omega c - \omega\beta)t + Q2n \sin(\omega c - \omega\beta)t$$

As apparent from the equation (62), in the case of using quadrature phase PSK modulation as data modulation using multi-carriers, the AM type modulated wave signal eliminating circuit C removes the AM type modulated wave signal from the AM data multiplexed modulated wave signal to extract only the multiplexed digital modulated signal.

As described so far, irrespective of the type of data modulation, the AM type modulated wave signal eliminating circuit C removes the AM type modulated wave signal to extract only the multiplexed digital modulated signal. The digital modulated signal output from the AM type modulated wave signal eliminating circuit C is supplied to the data demodulation circuit B to demodulate it into a baseband digital signal.

If the digital modulated signal output from the AM type modulated wave signal eliminating circuit C is converted into a different frequency, the frequency for the demodulation at the demodulation circuit B is required to match the converted frequency.

If AM data multiplex modulation uses differential coding, a delay detector may be connected to the next stage of the low-pass filter 9 of the data demodulation circuit and another delay detector may be connected to the next stage of the sign reverse unit 11 to thereby adopt a delay detection method.

Even if modulation other than QPSK modulation is used as digital modulation, the data demodulation circuit B can be used. In this case, the high-pass filter 7, low-pass filter 9, digital demodulators 8 and 10, and sign reverse unit 11 are modified in the following manner.

The high-pass filter 7 is modified to pass only a digital modulated wave signal whose frequency is higher than the AM carrier. The low-pass filter 9 is modified to pass only a digital modulated wave signal whose frequency is lower than the AM carrier. The digital demodulator 8 is modified to be a digital demodulator using digital modulation which receives a digital modulated wave signal modulated by a carrier whose frequency is higher than the AM carrier and outputs a digital baseband signal train. The digital demodulator 10 is modified to be a digital demodulator using digital modulation which receives a digital modulated wave signal modulated by a carrier whose frequency is lower than the AM carrier and outputs a digital baseband signal train. The sign reverse unit 11 is modified to recover the original sign of the digital baseband signal train reversed by an AM data multiplex modulator. The adder 12 is modified to add digital baseband signals of two series.

If the digital modulated wave signal is converted into a different frequency in the AM type modulated signal wave eliminating circuit C, the high-pass filter 7, low-pass filter 9 and digital demodulators 8 and 10 are modified to match the converted frequency. Specifically, the high-pass filter 7, low-pass filter 9 and digital demodulators 8 and 10 are modified assuming that in the AM type modulated wave signal eliminating circuit C, the AM carrier is also frequency converted and the AM carrier is $\omega c/2$ (rad/s).

2nd Type Demodulator Apparatus

An apparatus of a second type for demodulating an AM data multiplexed modulated wave signal will be described in connection with an embodiment of the present invention.

Figure 5:
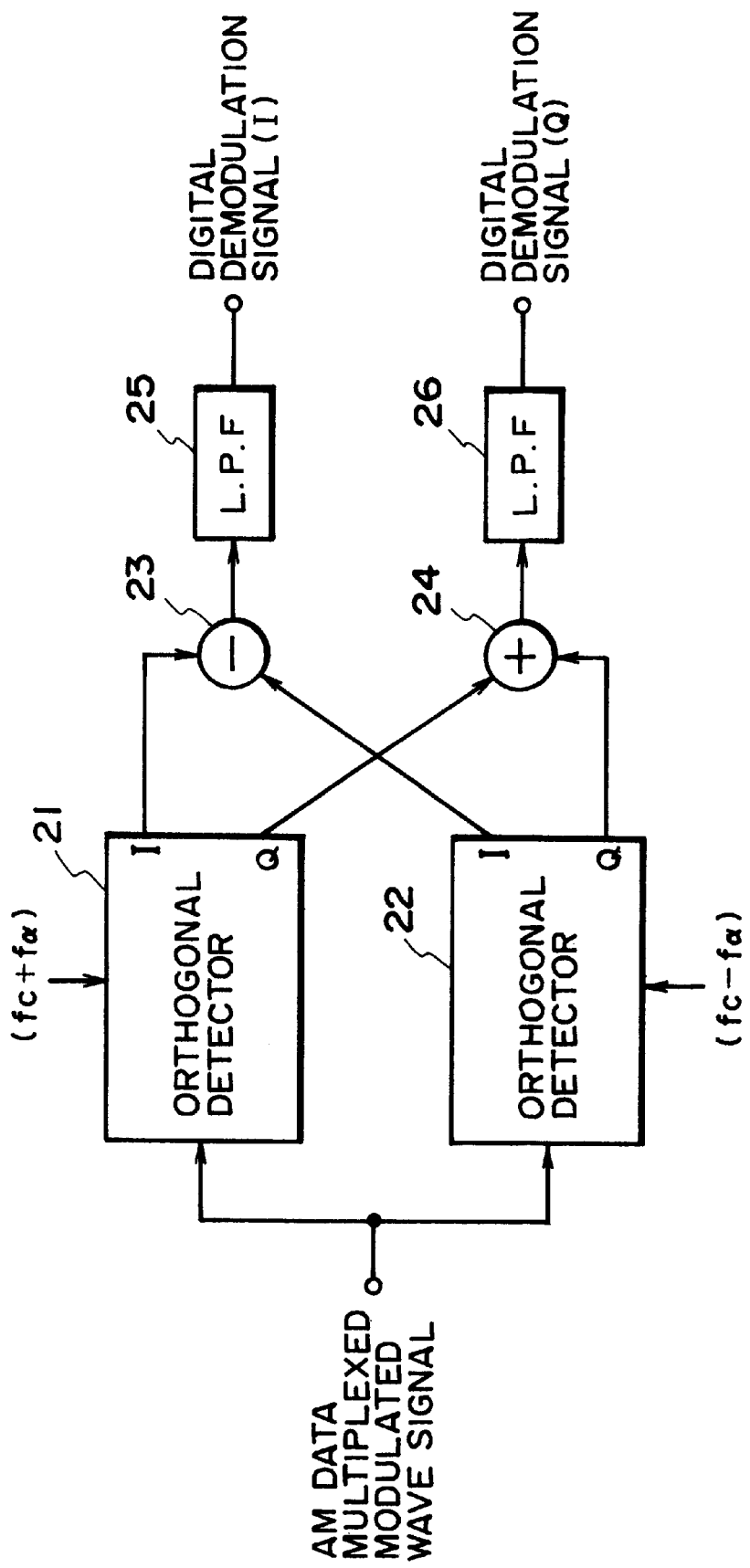
FIG. 5 is a block diagram showing the structure of an apparatus of a second type for demodulating an AM data multiplexed modulated wave signal according to an embodiment of the invention.

FIG. 5 is a block diagram showing the structure of the apparatus of the second type for demodulating an AM data multiplexed modulated wave signal. The apparatus of the second type for demodulating an AM data multiplexed modulated wave signal shown in FIG. 5 will be described by using QPSK (quadrature phase shift keying) modulation as digital modulation.

The apparatus of the second type for demodulating an AM data multiplexed modulated wave signal is constituted of: an orthogonal detector 21 for orthogonally detecting an AM multiplexed modulated wave signal with a signal having a frequency (fc+fα); an orthogonal detector 22 for orthogonally detecting the AM multiplexed modulated wave signal with a signal having a frequency (fc−fα); a subtractor 23 for calculating a difference between I signal components output from the orthogonal detector 21 and Q signal components output from the orthogonal detector 22; an adder 24 for adding together the Q signal components output from the orthogonal detector 21 and I signal components output from the orthogonal detector 22; a low-pass filter 25 for removing the high frequency components of an output of the subtractor 23; and a low-pass filter 26 for removing the high frequency components of an output of the adder 24.

The operation of the apparatus of the second type constructed as above for demodulating an AM data multiplexed demodulated wave signal will be described.

An AM data multiplexed modulated wave signal given by the equation (5) is input to the orthogonal detectors 21 and 22.

For the orthogonal detection by the orthogonal detector 21, the orthogonal detector 21 multiplies the AM multiplexed modulated wave signal v(t) given by the equation (5) by $\cos(\omega c+\omega\alpha)t$ and $\sin(\omega c+\omega\alpha)t$. These multiplication results are given by the following equations (63) and (64).

$$2\{v(t)\cos(\omega c + \omega\alpha)t\} = \{1 + \kappa\kappa m(t)\}\cos(-\omega\alpha)t + \qquad (63)$$
$$In \cos 0 + Qn \sin 0 - In \cos(-2\omega\alpha)t + Qn \sin(-2\omega\alpha)t +$$
$$\{1 + \kappa\kappa m(t)\}\cos(2\omega c + \omega\alpha)t + In \cos 2(\omega c + \omega\alpha)t +$$
$$Qn \sin 2(\omega c + \omega\alpha)t - In \cos 2\omega ct + Qn \sin 2\omega ct$$

$$2\{v(t)\cos(\omega c + \omega\alpha)t\} = -\{1 + \kappa\kappa m(t)\}\sin(-\omega\alpha)t - \qquad (64)$$
$$In \sin 0 + Qn \cos 0 + In \sin(-2\omega\alpha)t + Qn \cos(-2\omega\alpha)t +$$
$$\{1 + \kappa\kappa m(t)\}\sin(2\omega c + \omega\alpha)t + In \sin 2(\omega c + \omega\alpha)t -$$
$$Qn \cos 2(\omega c + \omega\alpha)t - In \sin 2\omega ct - Qn \cos 2\omega ct$$

For the orthogonal detection by the orthogonal detector 22, the orthogonal detector 22 multiplies the AM multiplexed modulated wave signal v(t) given by the equation (5) by $\cos(\omega c-\omega\alpha)t$ and $\sin(\omega c-\omega\alpha)t$. These multiplication results are given by the following equations (65) and (66).

$$2\{v(t)\cos(\omega c - \omega \alpha)t\} = \quad (65)$$
$$\{1 + \kappa\kappa m(t)\}\cos \omega \alpha t + In \cos 2\omega \alpha t - Qn \sin 2\omega \alpha t - In \cos 0 +$$
$$Qn \sin 0 + \{1 + \kappa\kappa m(t)\}\cos(2\omega c - \omega \alpha)t + In \cos 2\omega \alpha t +$$
$$Qn \sin 2\omega \alpha t - In \cos 2(\omega c - \omega \alpha)t + Qn \sin 2(\omega c - \omega \alpha)t$$

$$2\{v(t)\cos(\omega c - \omega \alpha)t\} = \quad (66)$$
$$-\{1 + \kappa\kappa m(t)\}\sin \omega \alpha t - In \sin 2\omega \alpha t + Qn \cos 2\omega \alpha t + In \cos 0 +$$
$$Qn \cos 0 + \{1 + \kappa\kappa m(t)\}\sin(2\omega c - \omega \alpha)t + In \sin 2\omega \alpha t -$$
$$Qn \cos 2\omega \alpha t - In \sin 2(\omega c - \omega \alpha)t - Qn \sin 2(\omega c - \omega \alpha)t$$

The calculation results by the equations (63) and (64) are input to the subtractor 23 to subtract the calculation result by the equation (65) from that by the equation (63). The calculation results by the equations (64) and (66) are input to the adder 24 to add them together. By using sin 0=0, cos 0=1, sin(−x)=−sin(x), and cos(−x)=cos(x), an output of the subtractor 23 is given by the following equation (67) and an output of the adder 24 is given by the following equation (68).

$$v(t)\cos(\omega c + \omega \alpha)t - v(t)\cos(\omega c - \omega \alpha)t = \quad (67)$$
$$In - In \cos 2\omega \alpha t - Qn \sin 2\omega \alpha t - In \cos 2\omega c t +$$
$$1/2\{In \cos 2(\omega c + \omega \alpha)t + Qn \sin 2(\omega c + \omega \alpha)t +$$
$$In \cos 2(\omega c + \omega \alpha)t - Qn \sin 2(\omega c + \omega \alpha)t$$

$$v(t)\sin(\omega c + \omega \alpha)t + v(t)\sin(\omega c - \omega \alpha)t = \quad (68)$$
$$Qn - In \sin 2\omega \alpha t + Qn \cos 2\omega \alpha t - Qn \cos 2\omega c t +$$
$$1/2\{In \sin 2(\omega c + \omega \alpha)t - Qn \cos 2(\omega c + \omega \alpha)t -$$
$$In \sin 2(\omega c + \omega \alpha)t - Qn \cos 2(\omega c + \omega \alpha)t$$

It can be understood that the amplitude modulation components are cancelled out during the processes of orthogonal detection and addition/subtraction because there is no term $\{1+\kappa\kappa m(t)\}$ in the equations (67) and (68).

An output of the subtractor 23 is supplied to the low-pass filter 25 to remove the high frequency components thereof and output a digital demodulation signal (I) which is indicated by IDEMOD. An output of the adder 24 is supplied to the low-pass filter 26 to remove the high frequency components thereof and output a digital demodulation signal (Q) which is indicated by QDEMOD. The output of the low-pass filter 25 is given by the following equation (69) and the output of the low-pass filter 26 is given by the following equation (70). Therefore, data multiplexed with the AM multiplex modulated wave signal, i.e., baseband digital signal, can be demodulated from the AM data multiplexed wave signal.

$$\text{IDEMOD} = In \quad (69)$$
$$\text{QDEMOD} = Qn \quad (70)$$

In the apparatus of the second type of this invention for demodulating an AM data multiplexed modulated wave signal, outputs of the subtractor 23 and adder 24 are supplied to the low-pass filters 25 and 26. The low-pass filters may be provided on the input side of the orthogonal detectors 21 and 22.

In the apparatus of the second type of this invention for demodulating an AM data multiplexed modulated wave signal, synchronization detection is actually performed. If differential data is performed on the side of AM data multiplexing and modulating, a delay detector may be provided at the output side of a low-pass filter to realize the delay detection.

In the apparatus of the second type of this invention for demodulating an AM data multiplexed modulated wave signal, QPSK data modulation is used by way of example. Other data modulation methods may be used on the side of AM data multiplexing and modulating. In this case, demodulation matching the modulation side is used.

3rd Type Demodulator Apparatus

An apparatus of a third type for demodulating an AM data multiplexed modulated wave signal will be described in connection with an embodiment of the present invention.

Figure 6:
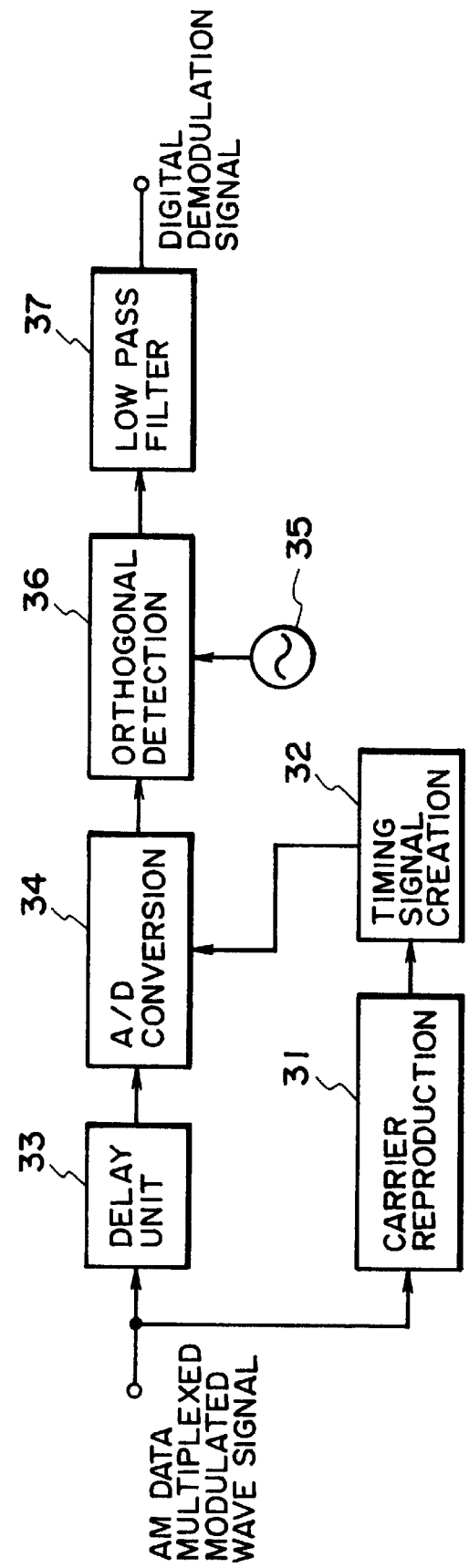
FIG. 6 is a block diagram showing the structure of an apparatus of a third type for demodulating an AM data multiplexed modulated wave signal according to an embodiment of the invention.

FIG. 6 is a block diagram showing the structure of the apparatus of the third type of this invention for demodulating an AM data multiplexed modulated wave signal. The apparatus of the third type for demodulating an AM data multiplexed modulated wave signal shown in FIG. 6 will be described by using QPSK (quadrature phase shift keying) modulation as digital modulation.

In the apparatus of the third type for demodulating an AM data multiplexed modulated wave signal, an input AM data multiplexed modulated wave signal is input to a carrier reproduction unit 31 to reproduce a carrier from the AM data multiplexed modulated wave signal. The carrier reproduced by the carrier reproduction unit 31 is sent to a timing creation unit 32 to generate a timing pulse at a timing when the amplitude of the carrier is 0.

The AM data multiplexed modulated wave signal is also inputted to a delay unit 33 to delay it by a predetermined time. The delay amount of the delay unit 33 is set to a sum of delay times of the carrier reproduction unit 31 and timing signal creation unit 32. The AM data multiplexed modulated wave signal delayed by the delay unit 33 is supplied to an A/D converter 34 which samples and A/D converts the AM data multiplexed modulated wave signal, in response to the timing signal output from the timing signal creation unit 32.

A dispersed signal output from the A/D converter 34 together with two orthogonal carrier signals output from an orthogonal carrier creation unit 35 is supplied to an orthogonal detection unit 36 to be orthogonally detected. An output of the orthogonal detection unit 36 is supplied to a low-pass filter 37 to remove the high frequency components thereof and output a digital demodulation signal.

The operation of the apparatus of the third type constructed as above for demodulating an AM data multiplexed demodulated wave signal will be described.

An AM data multiplexed modulated wave signal given by the equation (5) is input to the carrier reproduction unit 31 and delay unit 33.

In the apparatus of the third type for demodulating an AM data multiplexed demodulated wave signal shown in FIG. 6, the AM carrier in the AM data multiplexed modulated wave signal is cancelled out to perform demodulation and obtain a digital demodulation signal. This process will be described in the following.

The input AM data multiplexed modulated wave signal v(t) is branched to two circuit portions, the carrier reproduction unit 31 and delay unit 33. Carrier reproduction by the carrier reproduction unit 31 will first be described. A carrier used for AM type modulation is reproduced by the carrier reproduction unit 31, and an output vc(t) of the carrier reproduction unit 31 is given by the following equation (71)

$$vc(t) = \cos \omega c t \quad (71)$$

Next, the signal vc(t) is input to the timing signal creation unit 32 to generate a timing pulse used for A/D conversion. In this example, the timing pulse is output when the phase of the single frequency signal vc(t) is $(\pi/2)$. Namely, the timing signal is output so as to allow the A/D converter 34 to sample the AM data multiplexed modulated wave signal v(t) at the timing when the time t becomes as indicated by the following equation (72).

$$t = 1 + 4m/4fc \tag{72}$$

where m=0, 1, 2, 3, . . .

Therefore, at the sampling frequency fc (Hz) and at the time t indicated by the equation (72), the AM data multiplexed modulated wave signal v(t) is sampled by the A/D converter when the amplitude of the carrier is 0.

The AM data multiplexed modulated wave signal v(t) is delayed by the delay unit 33 by a delay time equal to a sum of delay times of the carrier reproduction unit 31 and timing signal creation unit 32. For simplicity purpose, the delay time does not taken into consideration and the delay amount of the delay unit 33 is assumed to be 0. Therefore, a signal output from the delay unit is the same as the AM data multiplexed modulated wave signal v(t) which is then input to the A/D converter 34 to be sampled in response to the timing pulse generated by the timing signal creation unit 32.

Therefore, the dispersed output signal vD(m) output from the A/D converter 34 is given by the following equation (73).

$$\begin{aligned}vD(m) = &\{1 + \kappa vm(t)\}\cos(1 + 4m)\pi/2 + \\ &In \cos\{(1+4m)\pi/2 + (1+4m)\pi f\alpha/2fc\} - \\ &In \cos\{(1+4m)\pi/2 - (1+4m)\pi f\alpha/2fc\} + \\ &Qn \sin\{(1+4m)\pi/2 + (1+4m)\pi f\alpha/2fc\} + \\ &Qn \sin\{(1+4m)\pi/2 - (1+4m)\pi f\alpha/2fc\} \\ = &\{1 + Kvm(t)\}\cos(1 + 4m)\pi/2 - \\ &2In \sin\{(1+4m)\pi/2 \cdot \sin(1+4m)\pi f\alpha/2fc\} + \\ &2Qn \sin\{(1+4m)\pi/2 \cdot \cos(1+4m)\pi f\alpha/2fc\}\end{aligned} \tag{73}$$

Since $\cos(1+4m)\pi/2=0$ and $\sin(1+4m)\pi/2=1$ when m=0, 1, 2, 3, . . . , the dispersed output signal vD(m) is given by the following equation (74).

$$vD(m) = -2In \sin\{(1+4m)\pi f\alpha/2fc\} + 2Qn \cos\{(1+4m)\pi f\alpha/2fc\} \tag{74}$$

Suppose that there is a signal given by the following equation (75), its dispersed signal vdD(m) after A/D conversion at the timing given by the equation (72) is given by the following equation (76).

$$vd(t) = -2In \sin \omega\alpha t + 2Qn \cos \omega\alpha t \tag{75}$$

$$\begin{aligned}vdD(m) = &-2In \sin\{2\pi f\alpha(1+4m/4fc)\} + \\ &2Qn \cos\{2\pi f\alpha(1+4m/4fc)\} \\ = &-2In \sin(1+4m)\pi f\alpha/2fc + \\ &2Qn \cos(1+4m)\pi f\alpha/2fc\end{aligned} \tag{76}$$

As seen from the comparison between the equations (76) and (4), these equations are the same, i.e., vD(m)=vdD(m). Therefore, it can be understood that the dispersed output signal vD(m) output from the A/D converter 34 after sampling the AM data multiplexed modulated wave signal v(t) when the amplitude of the carrier used for AM type modulation is 0, is equivalent to a signal obtained by sampling the signal vd(t) (QPSK modulated wave signal with the carrier frequency fα (Hz).

In this case, the sampling theorem is satisfied because |fc|≧2|fα| as described before.

The dispersed output signal vD(m) together with orthogonal carriers output from the orthogonal carrier creation unit 35 is input to the orthogonal detection unit 36. The orthogonal carriers output from the orthogonal carrier creation unit 35 are assumed to be −sinωαt and cosωαt. Therefore, outputs vI(t) and vQ(t) from the orthogonal detection unit 36 are given by the following equations (77) and (78).

$$\begin{aligned}vI(t) &= vd(t)(-\sin \omega\alpha t) \\ &= 2I - 2I \cos 2\omega\alpha t - 2Q \sin 2\omega\alpha t\end{aligned} \tag{77}$$

$$\begin{aligned}vQ(t) &= vd(t)\cos \omega\alpha t \\ &= 2Q - 2I \sin 2\omega\alpha t + 2Q \cos 2\omega\alpha t\end{aligned} \tag{78}$$

The outputs vI(t) and vQ(t) from the orthogonal detection unit 36 are input to the low-pass filer 37 to remove the high frequency components thereof. Outputs IDEMOD and QDEMOD from the low-pass filter 37 are given by the following equations (79) and (80). In the above manner, multiplexed data is demodulated.

$$IDEMOD = In \tag{79}$$

$$QDEMOD = Qn \tag{80}$$

In the apparatus of the third type of this invention for demodulating an AM data multiplexed modulated wave signal, the timing signal creation unit 32 outputs the sampling signal at the phase (π/2) of the carrier, i.e., when the amplitude of the carrier becomes 0. Similarly, the sampling signal may be output at the phase (3π/2) when the amplitude of the carrier becomes 0. In this case, since the signs of the complex signal train (In, Qn) are reversed, the original signs are recovered at the orthogonal detection unit 36 or at the later stage.

In the apparatus of the third type of this invention for demodulating an AM data multiplexed modulated wave signal, QPSK modulation is used as data modulation. If other data modulation methods are used for AM data multiplexing and modulating, the demodulation after orthogonal detection is required to be performed so as to match the other data modulation method. However, the structure before the A/D converter 34, i.e., before the AM type modulated components are cancelled out, can be used as it is. The structure only after the orthogonal detection unit is therefore changed so as to match the other data modulation method.

4th Type Demodulator Apparatus

An apparatus of a fourth type for demodulating an AM data multiplexed modulated wave signal will be described in connection with an embodiment of the present invention.

Figure 8:
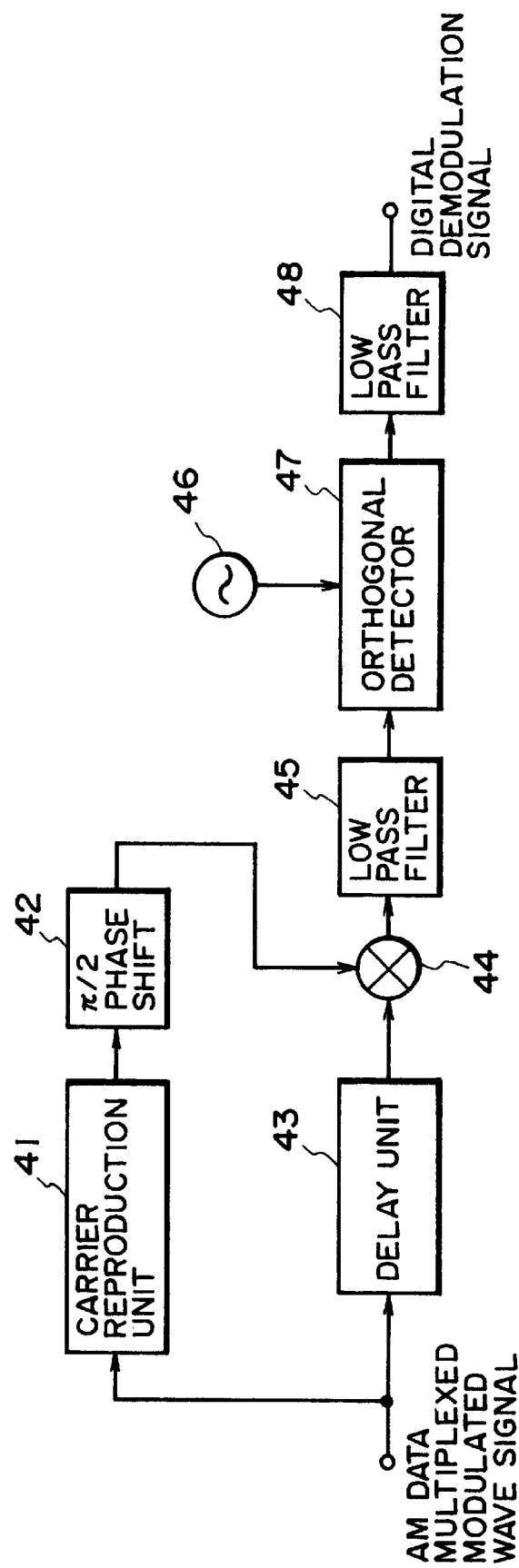
FIG. 8 is a block diagram showing the structure of an apparatus of a fourth type for demodulating an AM data multiplexed modulated wave signal according to an embodiment of the invention.

FIG. 8 is a block diagram showing the structure of the apparatus of the fourth type. of this invention for demodulating an AM data multiplexed modulated wave signal. The apparatus of the fourth type for demodulating an AM data multiplexed modulated wave signal shown in FIG. 8 will be described by using QPSK (quadrature phase shift keying) modulation as digital modulation.

In the apparatus of the fourth type for demodulating an AM data multiplexed modulated wave signal, an input AM data multiplexed modulated wave signal is input to a carrier reproduction unit 41 to reproduce a carrier from the AM data multiplexed modulated wave signal. The carrier reproduced by the carrier reproduction unit 41 is sent to a π/2 phase shift unit 42 to shift the phase of the carrier by π/2 radians.

The AM data multiplexed modulated wave signal is also inputted to a delay unit 43 to delay it by a predetermined time. The delay amount of the delay unit 43 is set to a sum of delay times of the carrier reproduction unit 41 and π/2 phase shift unit 42. The AM data multiplexed modulated wave signal delayed by the delay unit 43 is supplied to a multiplier 44 to multiply it by an output signal from the π/2 phase shift unit 42.

A multiplication output signal from the multiplier 44 is supplied to a low-pass filter 45 to remove the high frequency components thereof. An output signal of the low-pass filter 45 together with two orthogonal carrier signals output from an orthogonal carrier creation unit 46 is supplied to an orthogonal detection unit 47 to be orthogonally detected. An output of the orthogonal detection unit 46 is supplied to a low-pass filter 48 to remove the high frequency components thereof and output a digital demodulation signal.

The operation of the apparatus of the fourth type constructed as above for demodulating an AM data multiplexed demodulated wave signal will be described.

An AM data multiplexed modulated wave signal given by the equation (5) is input to the carrier reproduction unit 41 and delay unit 43.

In the apparatus of the fourth type for demodulating an AM data multiplexed demodulated wave signal shown in FIG. 8, the AM carrier in the AM data multiplexed modulated wave signal is cancelled out to perform demodulation and obtain a digital demodulation signal. This process will be described in the following.

The input AM data multiplexed modulated wave signal v(t) is branched to two circuit portions, the carrier reproduction unit 41 and delay unit 43.

Carrier reproduction by the carrier reproduction unit 41 will first be described. A carrier used for AM type modulation is reproduced by the carrier reproduction unit 41, and an output vc(t) of the carrier reproduction unit 41 is given by the following equation (81).

$$vc(t) = \cos \omega c t \quad (81)$$

Next, the signal vc(t) is input to the π/2 phase shift unit 42 to generate a signal orthogonal to the carrier used for AM type modulation. Namely, the π/2 phase shift unit 42 outputs a signal vcq(t) given by the following equation (82).

$$vcq(t) = \sin \omega c t \quad (82)$$

The branched AM data multiplexed modulated wave signal v(t) is delayed by the delay unit 43 by a delay time equal to a sum of delay times of the carrier reproduction unit 41 and π/2 phase shift unit 42. For simplicity purpose, the delay time does not taken into consideration and the delay amount of the delay unit 43 is assumed to be 0. Therefore, a signal output from the delay unit 43 is the same as the AM data multiplexed modulated wave signal v(t).

An output signal from the delay unit 43 is input to the multiplier 44 and multiplied by a signal output from π/2 phase shift unit 42. Therefore, an output signal vD(m) output from the multiplier 44 is given by the following equation (83).

$$\begin{aligned}vD(m) &= v(t) \cdot vcq(t) \quad (83)\\ &= [\{1+kvm(t)\}\cos \omega c t + In \cos(\omega c + \omega \alpha)t +\\ &\quad Qn \sin(\omega c + \omega \alpha)t - In \cos(\omega c - \omega \alpha)t +\\ &\quad Qn \sin(\omega c - \omega \alpha)t] \cdot \sin \omega c t\\ &= -1/2 \cdot \{1+kvm(t)\}\sin 0 +\\ &\quad 1/2 \cdot \{1+kvm(t)\}\sin 2\omega c t +\end{aligned}$$

-continued $$1/2 \cdot \{-In \sin \omega \alpha t + Qn \cos \omega \alpha t +$$
$$In \sin(-\omega \alpha)t + Qn \cos(-\omega \alpha)t\} +$$
$$1/2 \cdot \{In \sin(2\omega c + \omega \alpha)t -$$
$$Qn \cos(2\omega c + \omega \alpha)t\} +$$
$$1/2 \cdot \{-In \sin(2\omega c - \omega \alpha)t -$$
$$Qn \cos(2\omega c - \omega \alpha)t\}$$

This signal vDm(t) is input to the low-pass filter 45 to remove the high frequency components thereof. Since sin 0=0, cos(−x)=cos(x), and sin(−x)=−sin(x), an output signal vD(t) of the low-pass filter 45 is given by the following equation (84).

$$vD(t)=\tfrac{1}{2}\cdot\{-In \sin \omega \alpha t + Qn \cos \omega \alpha t\} \quad (84)$$

The output signal vD(t) from the low-pass filter 45 together with an output signal from the orthogonal carrier creation unit 46 is input to the orthogonal detection unit 47. The orthogonal carriers output from the orthogonal carrier creation unit 46 are assumed to be −sin ω α t and cos ω α t. Therefore, outputs vI(t) and vQ(t) from the orthogonal detection unit 47 are given by the following equations (85) and (86).

$$\begin{aligned}vI(t) &= vD(t)(-\sin \omega \alpha t) \quad (85)\\ &= 1/4 \cdot (In - In \cos 2\omega \alpha t - Qn \sin s\omega \alpha t)\end{aligned}$$

$$\begin{aligned}vQ(t) &= vD(t)\cos \omega \alpha t \quad (86)\\ &= 1/4 \cdot (Qn - In \sin 2\omega \alpha t + Qn \sin s\omega \alpha t)\end{aligned}$$

The outputs vI(t) and vQ(t) from the orthogonal detection unit 47 are input to the low-pass filer 48 to remove the high frequency components thereof. Outputs IDEMOD and QDEMOD from the low-pass filter 48 are given by the following equations (87) and (88). In the above manner, multiplexed data is demodulated.

$$IDEMOD = In/4 \quad (87)$$

$$QDEMOD = Qn/4 \quad (88)$$

In the apparatus of the fourth type of this invention for demodulating an AM data multiplexed modulated wave signal, QPSK modulation is used as data modulation. If other data modulation methods are used for AM data multiplexing and modulating, the demodulation after orthogonal detection is required to be performed so as to match the other data modulation method. However, the structure before the low-pass filter 45, i.e., before the AM type modulated components are cancelled out, can be used as it is. The structure only after the orthogonal detection unit 47 is therefore changed so as to match the other data modulation method.

As described so far, according to the apparatus for demodulating an AM data multiplexed modulated wave signal, it is possible for the apparatus with simple structure and small scale to demodulate a baseband digital signal from the multiplexed digital modulated wave signal whose AM type modulated components and data modulated components are multiplexed at the same frequency band and at the time timing.

What is claimed is:

1. An apparatus for demodulating an AM data multiplexed modulated wave signal to derive therefrom a baseband digital signal, the AM data multiplexed modulated wave signal being obtained by amplitude modulating a carrier having a frequency fc with an analog signal by an AM type modulator to multiplex digital modulated signals at frequency positions of (fc+fα) and (fc−fα) line symmetrical to the carrier having the frequency fc on the frequency axis, the apparatus comprising:

an AM type modulated wave signal eliminating circuit for removing an AM type modulated wave signal from an input AM data multiplexed modulated wave signal; and a data demodulation circuit for receiving an output of said AM type modulated wave signal eliminating circuit and deriving therefrom a baseband digital signal.

2. An apparatus for demodulating an AM data multiplexed modulated wave signal according to claim 1, wherein said AM type modulated wave signal eliminating circuit comprises:

a synchronization detector synchronously detecting the AM data multiplexed modulated wave signal;

an AM type modulator for amplitude modulating the carrier having the frequency fc with an output signal of said synchronization detector; and a subtractor circuit for substracting the AM type modulated wave signal output from said AM type modulator from the AM data multiplexed modulated wave signal, wherein an output of said substractor circuit is supplied to said data demodulation circuit.

3. An apparatus for demodulating an AM data multiplexed modulated wave signal according to claim 1, wherein said AM type modulated wave signal eliminating circuit comprises:

a first frequency converter for frequency converting by mixing the AM data multiplexed modulated wave signal and a signal having a frequency fu;

a second frequency converter for frequency converting by mixing the AM data multiplexed modulated wave signal and a signal having a frequency fl, where fu>fl and fu−fc=fc−fl; and a calculation circuit for calculating a difference between an output signal from said first frequency converter and an output signal from said second frequency converter, wherein an output of said calculation circuit is supplied to said data demodulation circuit.

4. An apparatus for demodulating an AM data multiplexed modulated wave signal according to claim 1, wherein said data demodulation circuit comprises:

a filter for picking up frequency components higher than the frequency fc from an output signal from said AM type modulated wave signal eliminating circuit; and demodulating means responsive to an output signal from said filter for performing demodulation associated with data modulation.

5. An apparatus for demodulating an AM data multiplexed modulated wave signal according to claim 1, wherein said data demodulation circuit comprises:

a filter for picking up frequency components lower than the frequency fc from an output signal from said AM type modulated wave signal eliminating circuit; and demodulating means responsive to an output signal from said filter for performing demodulation associated with data modulation.

6. An apparatus for demodulating an AM data multiplexed modulated wave signal according to claim 1, wherein said data demodulation circuit comprises:

a first filter for picking up frequency components higher than the frequency fc from a digital modulated wave signal output from said AM type modulated wave signal eliminating circuit;

first demodulating means responsive to an output signal from said first filter for performing demodulation associated with data modulation;

a second filter for picking up frequency components lower than the frequency fc from a digital modulated wave signal output from said AM type modulated wave signal eliminating circuit;

second demodulating means responsive to an output signal from said second filter for performing demodulation associated with data modulation;

sign reversing means for reversing a sign of a demodulation output from said first or second demodulating means; and adding means for adding the demodulation output whose sign was reversed and the demodulation output whose sign was not reversed.

7. An apparatus for demodulating an AM data multiplexed modulated wave signal to derive therefrom a baseband digital signal, the AM data multiplexed modulated wave signal being obtained by amplitude modulating a carrier having a frequency fc with an analog signal by an AM type modulator to multiplex digital modulated signals at frequency positions of (fc+fα) and (fc−fα) line symmetrical to the carrier having the frequency fc on the frequency axis, the apparatus comprising:

a first orthogonal detector for orthogonally detecting the AM data multiplexed modulated wave signal with a signal having a frequency (fc+fα);

a second orthogonal detector for orthogonally detecting the AM data multiplexed modulated wave signal with a signal having a frequency (fc−fα);

first calculation means for calculating a difference between I components output from said first orthogonal detector and I components output from said second orthogonal detector; and second calculation means for calculating a sum of Q components output from said first orthogonal detector and Q components output from said second orthogonal detector.

8. An apparatus for demodulating an AM data multiplexed modulated wave signal to derive therefrom a baseband digital signal, the AM data multiplexed modulated wave signal being obtained by amplitude modulating a carrier having a frequency fc with an analog signal by an AM modulator to multiplex digital modulated signals at frequency positions of (fc+fα) and (fc−fα) line symmetrical to the carrier having the frequency fc on the frequency axis, the apparatus comprising:

A/D converting means for sampling the AM data multiplexed modulated wave signal when a level of the carrier becomes 0 and A/D converting the sampled signal;

orthogonal detection means for orthogonally detecting an A/D converted and dispersed output signal with two orthogonal carrier signals having a frequency fα; and a low-pass filter for removing high frequency components of an orthogonally detected output.

9. An apparatus for demodulating an AM data multiplexed modulated wave signal to derive therefrom a baseband digital signal, the AM data multiplexed modulated wave signal being obtained by amplitude modulating a carrier having a frequency fc with an analog signal by an AM type modulator to multiplex digital modulated signals at frequency positions of (fc+fα) and (fc−fα) line symmetrical to the carrier having the frequency fc on the frequency axis, the apparatus comprising:

carrier reproduction means for reproducing the carrier from the AM data multiplexed modulated wave signal and shifting the phase of the reproduced carrier by π/2;

multiplying means for multiplying an output from said carrier reproduction means by the AM data multiplexed modulated wave signal;

orthogonal detection means for orthogonally detecting the multiplication output signal by two orthogonal carrier signals having a frequency fα; and a low-pass filter for removing high frequency components of an orthogonally detected output.

* * * * *